United States Patent
Shimazu et al.

(10) Patent No.: US 6,783,877 B2
(45) Date of Patent: Aug. 31, 2004

(54) FUEL REFORMING APPARATUS

(75) Inventors: Takashi Shimazu, Nagoya (JP); Satoshi Iguchi, Mishima (JP); Satoshi Aoyama, Susono (JP); Koichi Numata, Mishima (JP); Kazuhisa Kunitake, Susono (JP); Takeshi Nishikawa, Toyota (JP); Shuichi Kubo, Aichi-ken (JP); Satoshi Yamazaki, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 333 days.

(21) Appl. No.: 09/930,989

(22) Filed: Aug. 17, 2001

(65) Prior Publication Data

US 2002/0031690 A1 Mar. 14, 2002

(30) Foreign Application Priority Data

Sep. 13, 2000 (JP) .................................. 2000-277973
Jan. 10, 2001 (JP) .................................. 2001-002518

(51) Int. Cl.[7] ................................................ H01M 8/04
(52) U.S. Cl. ........................ 429/17; 429/13; 429/19; 429/20; 429/22; 429/23; 429/24; 429/26
(58) Field of Search ........................ 429/19, 20, 22, 429/23, 26, 24, 13, 17

(56) References Cited

U.S. PATENT DOCUMENTS

| 3,552,924 A | 1/1973 | Hepp ........................... 23/212 |
| 4,522,894 A | 6/1985 | Hwang et al. ................. 429/17 |
| 4,740,290 A | 4/1988 | Tomita et al. ................ 208/67 |
| 6,126,908 A | * 10/2000 | Clawson et al. ............ 422/190 |
| 6,322,917 B1 | * 11/2001 | Acker ......................... 429/17 |

FOREIGN PATENT DOCUMENTS

| DE | 42 35 214 A1 | 4/1994 |
| DE | 199 55 892 A1 | 6/2001 |
| EP | 0 435 736 A1 | 7/1991 |
| EP | 0 798 798 A2 | 10/1997 |
| JP | 11-79703 | 3/1999 |
| JP | 11-354144 | 12/1999 |
| WO | WO 00/26136 | 3/2000 |

* cited by examiner

*Primary Examiner*—Bruce F. Bell
(74) *Attorney, Agent, or Firm*—Oliff & Berridge, PLC

(57) ABSTRACT

In a fuel cell system 10, a cracking unit 20 is provided upstream of a reformer 36. When the cracking unit 20 is supplied with oxygen and gasoline as a hydrocarbon-based fuel, the gasoline is partially oxidized and decomposed using oxidation-generated heat to give a hydrocarbon with a lower carbon number. The hydrocarbon with the lower carbon number obtained by such gasoline pyrolysis is fed to the reformer 36 and supplied to a reforming reaction zone.

52 Claims, 13 Drawing Sheets

FUEL REFORMING APPARATUS

BACKGROUND OF THE INVENTION

1. Field of the Invention

The present invention relates to a fuel reforming apparatus for reforming a hydrocarbon-based fuel to produce a hydrogen-rich gas.

2. Description of the Related Art

Hydrogen-rich gas is producible by reforming hydrocarbon-based fuel. The hydrocarbon-based fuel can be natural gas primarily containing methane, an alcohol such as methanol, gasoline, or the like. The reforming catalyst and reforming reaction temperature are appropriately selected in accordance with the starting material fuel used when the hydrogen-rich gas is produced by the reforming reaction. The hydrogen-rich gas thus produced may, for example, be fed to fuel cells and used as fuel gas when electromotive force is to be created by an electrochemical reaction.

JP 11-79703A discloses a reforming apparatus in which gasoline is used as the reforming fuel, and a partial oxidation reaction is performed together with the steam reforming reaction in a water gas reforming reactor to produce a hydrogen-rich gas. A significant advantage of gasoline is that it is widely available as a commercial fuel for producing hydrogen-rich gas.

Using gasoline or another higher hydrocarbon-based fuel as a reforming reaction fuel is disadvantageous, however, in that soot tends to form in the reforming reactor. The soot gradually reduces the activity of the reforming reaction by covering the surface of the reforming catalyst within the reforming reactor. It is therefore desirable that soot formation be reduced and the activity of the reforming reaction be prevented from being reduced due to the soot coating on the reforming catalyst when gasoline or another higher hydrocarbon-based fuel is used as the reforming reaction fuel.

Another disadvantage of using gasoline or a similar higher hydrocarbon-based fuel for a reforming reaction is that this reaction is more difficult to perform in an adequate manner and that more fuel is likely to remain unreacted than when methanol, methane (natural gas), or another known hydrocarbon-based fuel with a lower carbon number is used. In addition, gasoline and other types of higher hydrocarbon-based fuel require higher reforming temperatures in comparison with methanol or the like, and any increase in the temperature of the reforming reaction increases the activity of unwanted reactions involving carbon monoxide, methanol, and the like in the gas phase. Consequently, any attempt to conduct a reforming reaction in an adequate manner is more likely to bring about the opposite result, that is, to promote the formation of carbon monoxide, methane, and other undesirable components.

SUMMARY OF THE INVENTION

According to a present invention, there is provided a fuel reforming apparatus for producing a hydrogen-rich gas from a hydrocarbon-based fuel by means of a reforming reaction. The fuel reforming apparatus comprises a fuel decomposition unit and a reforming reactor. The fuel decomposition unit is configured to decompose a first hydrocarbon-based fuel into a second hydrocarbon-based fuel with a lower carbon number. The reforming reactor includes a reforming catalyst for promoting a reforming reaction. The reforming reactor is configured to produce a hydrogen-rich gas from the second hydrocarbon-based fuel by the reforming reaction.

Since the second hydrocarbon-based fuel with a lower carbon number is supplied to the reforming reaction zone, it is possible to reduce formation of soot, which is normally produced because of the high carbon number of the hydrocarbon-based fuel. Such reduced soot formation makes it possible to prevent situations in which the surface of the reforming catalyst is covered with soot, reducing the activity of the reforming reaction. It is also possible to increase the efficiency of the reforming reaction in the reforming reactor. As a result, the reforming reaction can be conducted at a lower temperature, and the reforming unit can be made more compact. Another factor is that the higher the carbon number of the hydrocarbon-based fuel, the more likely it is to adsorb on the surface of the reforming catalyst and to poison the catalyst. Decomposing the hydrocarbon-based fuel before feeding it to the reforming reactor makes it possible to prevent situations in which the activity of the reforming reaction is reduced by the adsorption of the hydrocarbon-based fuel on the catalyst surface.

According to another aspect of the present invention, a fuel reforming apparatus comprises a reforming reactor having a reforming catalyst for promoting the reforming reaction; and means for feeding the hydrocarbon-based fuel to the reforming reactor. The reforming reactor maintains activity of the reforming reaction occurring on a surface of the reforming catalyst while suppressing unwanted gas-phase reactions occurring in the reforming reactor off the surface of the reforming catalyst.

This fuel reforming apparatus suppresses soot formation by reducing the activity of unwanted reactions occurring in the gas phase.

The present invention is further directed to a fuel cell system comprising a fuel cell for generating electromotive force by electrochemical reactions, and a fuel decomposition unit configured to decompose a first hydrocarbon-based fuel into a second hydrocarbon-based fuel with a lower carbon number, wherein the second hydrocarbon-based fuel is fed to the fuel cell to cause the electrochemical reactions.

With this fuel cell apparatus, the undesirable phenomena resulting from the formation of soot in the fuel cell can be prevented because the hydrocarbon-based fuel is decomposed in order to reduce the carbon number before this fuel is fed to the fuel cell. Although the fuel cell is configured such that hydrocarbon-based fuel can be fed directly inside the cell, it is also possible to adopt an arrangement in which a reforming catalyst is further provided on the inside, and hydrogen obtained by reforming the hydrocarbon-based fuel being fed is supplied to the electrochemical reaction zone, or an arrangement in which the hydrocarbon-based fuel being fed is supplied directly to the electrochemical reaction zone.

The present invention is also directed to a method for starting up a fuel cell system, which comprises a fuel cell, and a fuel decomposition unit configured to receive a supply of oxygen and first hydrocarbon-based fuel, and to partially oxidize the first hydrocarbon-based fuel using the oxygen, and to pyrolize the remaining first hydrocarbon-based fuel using oxidation-evolved heat to thereby produce a second hydrocarbon-based fuel with a lower carbon number, where the second hydrocarbon-based fuel is fed to the fuel cell from the fuel decomposition unit. This method is characterized by raising a ratio of an amount of oxygen to an amount of the first hydrocarbon-based fuel fed to the fuel decomposition unit until the fuel cell is heated up to a specified temperature, thereby adequately causing partial oxidation of the first hydrocarbon-based fuel in the fuel decomposition unit and promoting oxidation of hydrogen and carbon monoxide produced by the partial oxidation reaction on an anode-side catalyst inside the fuel cell.

This method allows the requisite warming time to be reduced during the startup of a fuel cell apparatus because the hydrogen and carbon monoxide obtained by the partial oxidation of the first hydrocarbon-based fuel have high oxidation activity and are capable of initiating vigorous oxidation reactions in the fuel cell.

The present invention can be implemented as a variety of embodiments, examples of which include: fuel reforming apparatus, fuel cell systems having the fuel reforming apparatus, methods of operating the apparatus or system, and vehicles having the fuel cell system.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention will now be described through embodiments in the following sequence in order to provide a better understanding of the structure and operation of the above-described invention.

Figure 1:
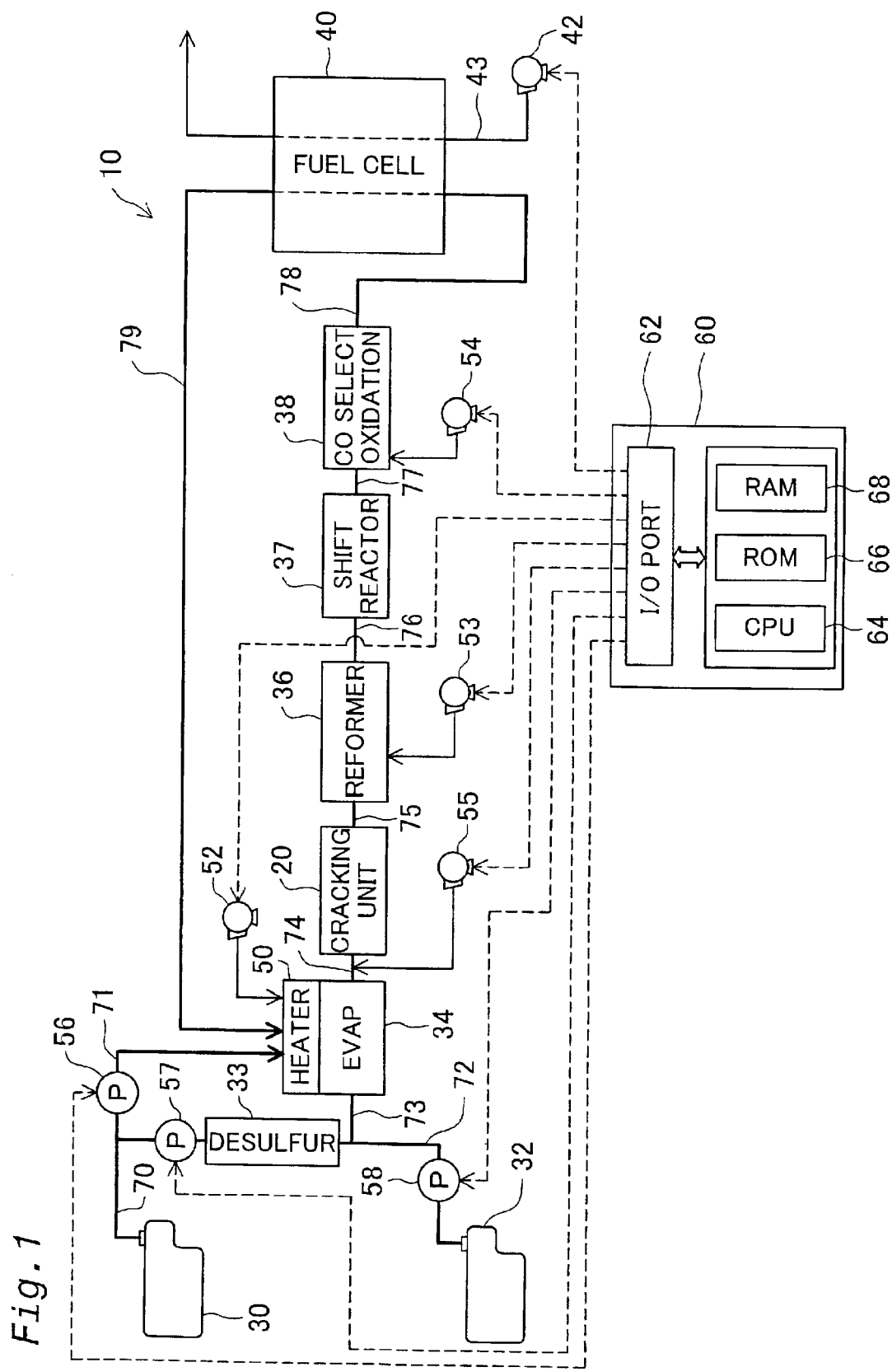
FIG. 1 is a block diagram schematically depicting the structure of a fuel cell system 10, which is a preferred embodiment of the present invention.

1. Overall Configuration of Fuel Cell System 10 According to First Embodiment
2. Reactions in Cracking Unit 20
3. Reaction Control in Cracking Unit Under Variable Load
4. Modifications of Fuel Cell System 10
5. Indirect Heating of Cracking Unit 20
6. Reformer With Inhibited Gas-phase Reactions
7. Fuel Cells With Direct Fuel Supply 1. Overall Configuration of Fuel Cell System 10 According to First Embodiment FIG. 1 is a block diagram schematically depicting the structure of a fuel cell system 10, which is a first preferred embodiment of the present invention. The fuel cell system 10 comprises the following principal constituent elements: a gasoline tank 30 for storing gasoline, a water tank 32 for storing water, a desulfurizer 33 for removing sulfur from the gasoline, an evaporator 34 provided with a heater 50, a cracking unit 20 for pyrolyzing the gasoline, a reformer (reforming reactor) 36 for producing a hydrogen-rich gas by a reforming reaction, a water gas shift reactor 37 for reducing the concentration of carbon monoxide (CO) in the hydrogen-rich gas by a shift reaction, a CO selective oxidation unit 38 for reducing the concentration of carbon monoxide in the hydrogen-rich gas by oxidation, a fuel cell 40 for creating electromotive force by an electrochemical reaction, a blower 42 for compressing air and feeding it to the fuel cell 40, and a control unit 60 composed of a computer. A distinctive feature of the fuel cell system 10 pertaining to the present embodiment is that a cracking unit 20 for pyrolyzing gasoline is provided in front of the reformer 36. The overall configuration of the fuel cell system 10 will be described first with reference to FIG. 1.

The gasoline stored in the gasoline tank 30 is fed to the desulfurizer 33 and heater 50. The fuel conduit 70 connecting the gasoline tank 30 and desulfurizer 33 is provided with a pump 57, and another pump 56 is provided to a branch line 71 that branches off from the fuel conduit 70 and leads to the heater 50. The pumps 56 and 57 are coupled to the control unit 60 and are actuated by the output signal of the control unit 60 to control the rate at which gasoline is fed to the desulfurizer 33 and heater 50.

The desulfurizer 33 employs adsorption to remove the sulfur contained in the gasoline being fed. In the fuel cell system 10, a desulfurizer 33 is placed in front of the reformer 36 to remove sulfur because the sulfur lowers the activity of the reforming catalyst within the reformer 36 and inhibits reforming reactions. After being freed from sulfur in the desulfurizer 33, the gasoline is fed to the evaporator 34 via a fuel conduit 73.

A water conduit 72 for transporting water from the water tank 32 is connected to the fuel conduit 73. Water passing through the conduit 72 is mixed with the gasoline passing through the fuel conduit 73 in the connection area thereof, and is fed together with the gasoline to the evaporator 34. The water conduit 72 is provided with a pump 58. The pump 58 is connected to the control unit 60 and is actuated by the output signal of the control unit 60 to adjust the rate at which water is fed to the evaporator 34 via the water conduit 72.

The evaporator 34 is a device for vaporizing the sulfur-free gasoline and the water from the water tank 32. A supply of gasoline and water is received by the evaporator in the above-described manner, a gas (referred to hereinbelow as "mixed gas") comprising steam and gasoline gas is formed, and this gas is heated to a specified temperature. The mixed gas discharged from the evaporator 34 is fed to the cracking unit 20 via a fuel gas conduit 74. The evaporator 34 is also provided with a heater 50 as a source of heat for vaporizing water and gasoline. The heater 50 receives a supply of gasoline from the gasoline tank 30 or anode off-gas from fuel cells, which are described below. The heater 50 also receives a supply of compressed air from a blower 52. The heater 50, which is provided with an internally disposed combustion catalyst, is designed to perform combustion reactions of the aforementioned gasoline or anode off-gas and air, to evolve heat as desired, and to transmit the heat thus evolved to the evaporator 34. The quantity of heat evolved in the heater 50 is adjusted by controlling the rate at which the gasoline or anode off-gas is fed to the heater 50, whereby the mixed gas can be heated in the evaporator 34 to a temperature that matches the reaction temperature of the cracking unit 20.

When the mixed gas is fed to the cracking unit 20, the gasoline in the mixed gas is partially combusted to generate heat, and the remaining gasoline is pyrolyzed using the heat produced by the combustion reaction. In this arrangement, the cracking unit 20 is also provided with a blower 55 for supplying the cracking unit 20 with the oxygen (air) needed for combustion. The air fed by the blower 55 is added to the mixed gas passing through the fuel gas conduit 74 and is supplied to the reaction zone in the cracking unit 20. The blower 55 is connected to the control unit 60 and is actuated by the output signal of the control unit 60 to adjust the rate at which the air is fed to the cracking unit 20. Although the arrangement depicted in FIG. 1 is described with reference to a case in which the conduit for transmitting the air from the blower 55 is connected to the fuel gas conduit 74, it is also possible to adopt an arrangement in which the conduit is directly connected to the cracking unit 20 and the air from the blower 55 can be passed through the cracking unit 20 after being thoroughly mixed with the mixed gas. The mixed gas is converted to a gas (referred to hereinbelow as "reforming fuel gas") containing steam and a hydrocarbon whose carbon number is lower than that of gasoline by the pyrolysis of gasoline in the cracking unit 20, and is then fed to the reformer 36 via a fuel gas conduit 75. The structure of the cracking unit 20 will be described in further detail below.

The reformer 36 is provided with an internally disposed reforming catalyst, and the reforming fuel gas being fed is reformed to produce a hydrogen-rich fuel gas. The reforming catalyst can be a noble metal (platinum, palladium, rhodium, or the like) or an alloy thereof. In the reformer 36 of the present embodiment, a partial oxidation reaction commonly accompanying hydrogen formation proceeds concurrently with the steam reforming reaction during the production of hydrogen-rich gas. Since the partial oxidation reaction is an exothermic reaction, heat generated by the partial oxidation reaction can be used in addition to the heat supplied by the reforming fuel gas from the cracking unit 20 when the steam reforming reaction is carried out. The reformer 36 is also provided with a blower 53 for feeding outside air to the reformer 36 in order to provide the oxygen needed for partial oxidation. The blower 53 is connected to and controlled by the control unit 60.

Although the fuel cell system 10 of the present embodiment is described with reference to a case in which air was fed to the reformer 36 and the heat needed for steam reforming is supplied in the form of heat generated by oxidation, it is also possible to adopt an arrangement in which hydrogen is produced solely by a steam reforming reaction without any oxidation reactions occurring in the reformer 36. According to another possible arrangement, a steam reforming reaction characterized by high hydrogen production efficiency is promoted over a partial oxidation reaction. When such an arrangement is adopted, the reformer 36 should be provided with a heater or other heating apparatus in order to supply the heat required for steam reforming.

The hydrogen-rich fuel gas produced by the reformer 36 is fed to the water gas shift reactor 37 via a gas conduit 76. The shift reactor 37 is a device for reducing the concentration of carbon monoxide in the hydrogen-rich thus fed. The hydrogen-rich gas produced by a reforming reaction from the reforming fuel gas in the reformer 36 contains some amount (about 10%) of carbon monoxide, but the concentration of carbon monoxide in the hydrogen-rich gas is reduced by the water gas shift reactor 37.

The water gas shift reactor 37 is a device for reducing the concentration of carbon monoxide in the hydrogen-rich gas by reacting the carbon monoxide with water to initiate a shift reaction that generates hydrogen and carbon dioxide. The shift reactor is provided with a catalyst for promoting the shift reaction. Known examples of catalysts (catalyst metals) for promoting shift reactions include low-temperature catalysts such as copper-based catalysts, and high-temperature catalysts such as iron-based catalysts. The shift reactor 37 may be provided with either type of shift catalyst, including arrangements in which the carbon monoxide concentration is reduced even further by combining low- and high-temperature catalysts. The shift catalyst for the shift reactor 37 should be appropriately selected in accordance with the concentration of carbon monoxide in the hydrogen-rich gas supplied from the reformer, the allowable concentration of carbon monoxide in the fuel gas to operate the fuel cell 40, and the like. A Cu—Zn catalyst is provided to the shift reactor 37 of the present embodiment. The shift reaction promoted by this shift catalyst is expressed by Eq. (1) below.

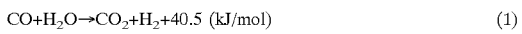

$$CO+H_2O \rightarrow CO_2+H_2+40.5 \text{ (kJ/mol)} \qquad (1)$$

Although this is not shown in FIG. 1, a heat exchanger may also be interposed between the reformer 36 and shift reactor 37. Whereas gasoline is typically reformed in the reformer 36 at the temperature of 600° C. or greater, the shift reaction occurring in the shift reactor 37 can be adequately performed within a temperature range of 200–400° C. in the presence of the above-described catalyst. A heat exchanger between the reformer 36 and the water gas shift reactor 37 will reduce the temperature of the hydrogen rich gas to be introduced into the shift reactor 37. In addition, since the shift reaction is an exothermic reaction (as shown by Eq. (1)), it is possible to adopt a cooling means inside the shift reactor 37 such that the temperature inside the shift reactor 37 is kept within the desired temperature range. The hydrogen-rich gas whose carbon monoxide concentration has been reduced in the shift reactor 37 is fed to the CO selective oxidation unit 38 via a conduit 77.

The CO selective oxidation unit 38 is a device designed to lower even further the concentration of carbon monoxide in the hydrogen-rich gas supplied from the shift reactor 37. Specifically, the concentration of carbon monoxide in the hydrogen-rich gas is reduced to approximately several percent in the shift reactor 37, but the same carbon monoxide concentration is reduced to approximately several parts per million in the CO selective oxidation unit 38. The reaction occurring in the CO selective oxidation unit 38 is a carbon monoxide selective oxidation reaction whereby carbon monoxide is oxidized more readily than the hydrogen contained in high concentration in the hydrogen-rich gas. The CO selective oxidation unit 38 is packed with a supported platinum catalyst, ruthenium catalyst, palladium catalyst, or gold catalyst, or with an alloy catalyst containing any of these as its primary element. These catalysts are used for the selective oxidation of carbon monoxide. Carbon monoxide can be selectively oxidized in a satisfactory manner by keeping the reaction temperature at 100–200° C. in the presence of such carbon monoxide selective oxidation catalysts.

The CO selective oxidation unit 38 is also provided with a blower 54 in order to supply the oxygen needed for the carbon monoxide selective oxidation reaction in the CO selective oxidation unit 38. The blower 54 receives outside air, compresses it, and feeds it to the CO selective oxidation unit 38. The blower 54 is connected to the control unit 60, and the rate at which the air (oxygen) is fed to the CO selective oxidation unit 38 is adjusted by the control unit 60. The carbon monoxide selective oxidation reaction occurring in the CO selective oxidation unit 38 is an exothermic reaction. The CO selective oxidation unit 38 is therefore provided with internally disposed cooling means in order to keep the internal temperature (catalyst temperature) at the aforementioned desired reaction level.

After its carbon monoxide concentration has been reduced in the CO selective oxidation unit 38 in the above-described manner, the hydrogen-rich gas is guided toward the fuel cell 40 through a fuel gas conduit 78 and is supplied as a fuel gas to sustain the cell reactions on the anode side. The anode off-gas is discharged into an anode off-gas conduit 79 and guided toward the heater 50 in the above-described manner, and the hydrogen remaining in the anode off-gas is consumed as combustion fuel. Meanwhile, the oxidation gas to be used in the cell reactions on the cathode side of the fuel cell 40 is fed as compressed air via an oxidation gas conduit 43 by the blower 42, which is provided with drive signals from the control unit 60. The cathode off-gas is discharged outside.

The fuel cell 40 is a cell that has a solid polymer electrolyte and is obtained by the stacking of a plurality of unit cells, each of which comprises an electrolyte membrane, an anode, a cathode, and a separator. The electrolyte membrane may be a proton-conducting ion-exchange membrane composed of a fluororesin or other solid polymer material. The anode and cathode are both composed of a carbon cloth woven from carbon fibers. A catalyst layer provided with the catalyst for facilitating electrochemical reactions is disposed between the electrolyte membrane and the anode or cathode. The catalyst may be platinum or an alloy comprising platinum and other metals. The separator may be formed from gas-impermeable dense carbon obtained by compressing carbon, from a metal having high corrosion resistance, or from any other electroconductive member impermeable to gases. The separator forms conduits for fuel and oxidation gases between the anode and cathode. In the fuel cell 40, electromotive force is created by feeding hydrogen-rich gas as the fuel gas, and compressed air as the oxidation gas to the aforementioned conduits in order to sustain electrochemical reactions. The electricity generated by the fuel cell 40 is fed to a specified load connected to the fuel cell 40. Described below is an electrochemical reaction occurring in the fuel cell 40. Eq. (2) expresses the reaction on the anode side; Eq. (3), the reaction on the cathode side; Eq. (4), the reaction occurring in the entire cell.

$$H_2 \rightarrow 2H^+ + 2e- \tag{2}$$

$$(1/2)O_2 + 2H^+ + 2e- \rightarrow H_2O \tag{3}$$

$$H_2 + (1/2)O_2 \rightarrow H_2O \tag{4}$$

The control unit 60 is composed of logic circuits based on a microcomputer. In more specific terms, the unit comprises a CPU 64 that executes specified calculations in accordance with a preset control program; a ROM 66 that holds pre-stored control programs, control data, and other types of data needed to execute various types of arithmetic processing in the CPU 64; a RAM 68 for providing temporary storage for the various types of data needed to execute the various types of arithmetic processing in the CPU 64; an input/output port 62 for inputting sensing signals from the various sensors provided to the fuel cell system 10 and for inputting information and other data related to the load connected to the fuel cell, as well as for outputting drive signals to the above-described blowers, pumps, and the like in accordance with the computational results obtained by the CPU 64. The control unit 60 controls the operation of the entire fuel cell system 10 by the above-described signal input and output.

2. Reactions in Cracking Unit 20

Following is a detailed description of the reactions occurring in the cracking unit 20. The cracking unit 20 is a device for partially combusting the gasoline in the mixed gas to generate heat, and pyrolyzing the remaining gasoline with the aid of the heat generated by the combustion reaction, as described above. The rate at which gasoline is fed to the cracking unit 20 is determined based on the magnitude of the load connected to the fuel cell 40 (which may be the magnitude of the load as such or may be an instruction from the outside indicative of the magnitude of the load), and is equal to the rate that ultimately allows the desired amount of hydrogen to be fed to the fuel cell 40 when gasoline is adequately combusted and decomposed in the cracking unit 20 and when the reforming reaction proceeds in the reformer 36 in a satisfactory manner. The rate at which gasoline is to be fed to the cracking unit 20 may, for example, be defined in advance for all possible magnitudes of the load, and the results can be stored in the control unit 60 as maps. When the feed rate of gasoline is controlled, information about the magnitude of the load is entered into the control unit 60, and the control unit 60 obtains information about the feed rate of gasoline by referencing the maps on the basis of the information thus entered, controls the aforementioned pump 57 and the like, and adjusts the feed rate of gasoline.

In the combustion reaction occurring in the cracking unit 20, the gasoline-constituting hydrocarbons are dehydrogenized to give hydrogen; the carbon atoms of the molecules obtained by dehydrogenizing the hydrocarbons are oxidized to give carbon monoxide and carbon dioxide; and the bonds between the carbons of the partially dehydrogenized hydrocarbons are broken to give a hydrocarbon with a lower carbon number. In other words, the combustion reaction occurring in the cracking unit 20 can be seen as a partial oxidation reaction. The shift reaction expressed by Eq. (1) above can be performed to produce hydrogen in the cracking unit 20, reformer 36, or shift reactor 37. The hydrocarbon with the low carbon number produced by the combustion reaction is fed to the reforming reaction zone in the reformer 36, where hydrogen is produced. Consequently, the electrochemical reaction zone in the fuel cell 40 is supplied with the hydrogen produced in the cracking unit 20 in addition to the hydrogen produced in the reformer 36 and shift reactor 37, and gasoline is fed at a controlled rate to the cracking unit 20 to allow the rate at which hydrogen is fed to the fuel cell 40 to ultimately reach the desired level.

2-1. Soot Formation in Cracking Unit 20

The cracking unit 20 is a device designed to allow gasoline to be combusted or decomposed in the above-described manner, and there is a risk that soot will be formed by the combustion and decomposition reactions if certain conditions are established during either of these reactions. A drawback is that when soot is formed in the gas passing through the cracking unit 20, the soot-containing gas is fed unchanged to the downstream side and is deposited on the catalysts in the reformer 36, shift reactor 37, and CO selective oxidation unit 38, inhibiting the reactions occurring on the catalysts. Another drawback is that the formation of soot in the cracking unit 20 results in reduced efficiency for the entire fuel cell system 10. When the combustion reaction proceeds adequately and only a small amount of soot forms in the cracking unit 20 under such conditions, the carbon atoms in the molecules obtained by dehydrogenating gasoline-constituting hydrocarbons are oxidized to give carbon monoxide, and hydrogen is formed by providing this carbon monoxide for the shift reaction expressed by Eq. (1), as described above. In addition, the reformer 36 is supplied with a product obtained by the decomposition of molecules resulting from the partial dehydrogenation of gasoline-constituting hydrocarbons to give a hydrocarbon with a lower carbon number, and hydrogen is produced by a reforming reaction. It is believed, however, that the soot-forming portion of the carbon contained in the gasoline-constituting hydrocarbons fails to contribute to the above-described hydrogen production if soot is formed in the cracking unit 20, with the result that hydrogen production decreases in accordance with the extent of soot formation, and hydrogen is obtained from gasoline in a less efficient manner.

The conditions related to soot formation in the cracking unit 20 includes internal temperature, oxygen feed rate, and residence time. The cracking unit 20 has a property whereby soot-forming reactions become more active when the internal temperature of the unit exceeds a specified level of about 1300 K. The soot-forming reactions also become more active when an oxygen deficiency is created in the cracking unit 20. Another property of the cracking unit 20 is that reactions that lead to soot formation become more prominent as the mixed gas fed thereto remains inside the cracking unit 20 for longer periods, so controlling the residence time is an effective means of suppressing soot formation. These conditions are not independent of each other and are inter-related when control routines are performed in order to suppress soot formation (for example, excessive oxygen supply results in elevated internal temperatures). The feed rate of steam and the like also have an effect on these conditions. Following is a more detailed description of the relation between soot formation and the reaction conditions in the cracking unit 20.

2-1-1. Oxygen Feed Rate and Soot Formation

As described above, a lack of oxygen in the cracking unit 20 creates a risk that an unacceptably large amount of soot will be formed in the cracking unit 20 (in the gas phase of the gas passing through the cracking unit 20). This is attributed to the fact that the presence of oxygen in the cracking unit 20 during gasoline decomposition causes various intermediates to be produced by partial oxidation and inhibits reaction pathways leading to soot formation, whereas an oxygen deficiency inhibits gasoline oxidation, promotes molecular growth through inter-radical bonding in the lower hydrocarbons (primarily olefins with carbon numbers of 4 and less) formed during the decomposition of gasoline-constituting hydrocarbons, and activates soot-forming reactions.

The aforementioned undesirable phenomena based on soot formation also occur when excess oxygen is fed to the cracking unit 20. Specifically, feeding excess oxygen to the cracking unit 20 increases the temperature inside the cracking unit 20 due to the increased activity of combustion reactions inside the cracking unit 20, resulting in further activation of the combustion reactions (increase in reaction rate). Making the combustion reactions inadmissibly active in this manner allows soot to be formed as a result of the fact that oxygen is consumed by the combustion reactions at an unacceptable rate, an oxygen deficiency is ultimately created in the cracking unit 20, and a high-temperature field is created by a more active combustion.

Consequently, the rate at which oxygen (air) is fed to the cracking unit 20 should be controlled such that combustion and decomposition proceed in an optimal manner in the cracking unit 20 in order to prevent undesirable phenomena based on soot formation from occurring. When a specific amount of gas is to be fed to the cracking unit 20, the rate at which oxygen is fed to the cracking unit 20 can be controlled as the amount of oxygen contained in the gas to the amount of gasoline contained in the gas. This type of control may, for example, be accomplished by selecting a prescribed O/C setting, which is the ratio of the mole number of oxygen atoms in the gas to the mole number of the carbon atoms contained in the gasoline portion of the gas.

Feeding excess oxygen to the cracking unit 20 in this manner creates a risk that an unacceptably high temperature will be established in the cracking unit 20. Such an increase in temperature inside the cracking unit 20 brings about soot formation through actions other than those involved in the aforementioned activation of combustion reactions and the resulting oxygen deficiency. Specifically, various reactions accompany gasoline decomposition or oxidation in the cracking unit 20, and the reactions that provide pathways to soot formation area are activated when the internal temperature of the cracking unit 20 exceeds a specified level. Consequently, the internal temperature of the cracking unit 20 should be appropriately selected together with the rate at which oxygen is fed to the cracking unit 20 in order to minimize soot formation in the cracking unit 20. Since soot formation becomes particularly pronounced when the internal temperature of the cracking unit 20 exceeds 1300 K, the present embodiment envisages controlling the internal temperature of the cracking unit 20 such that adequate reaction activity is kept within a range below this temperature.

Figure 2A:
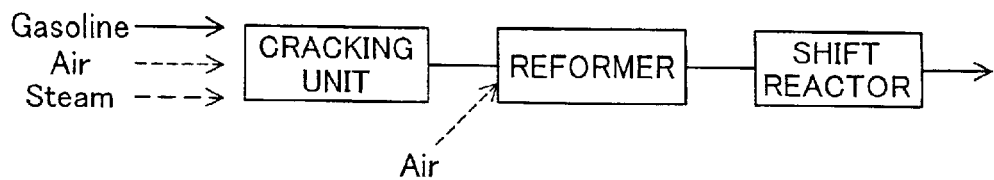
FIGS. 2(A)–2(D) illustrate various combinations of fluids fed to the reactors constituting the fuel cell system 10.
Figure 2B:
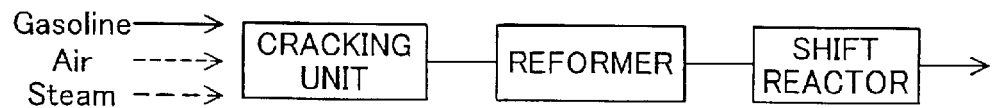

The oxygen unconsumed by combustion in the cracking unit 20 is fed to the reformer 36 as a component of the aforementioned reforming fuel gas and is used to perform partial oxidation in the reformer 36. FIGS. 2(A)–2(D) illustrate various combinations of fluids fed to the reactors constituting the fuel cell system 10. In FIGS. 2(A)–2(D), pumps, blowers, piping, and valves used to feed various fluids are omitted for convenience of illustration. The structure of the fuel cell system 10 shown in FIG. 1 corresponds to FIG. 2(A). Specifically, the fuel cell system 10 shown in FIG. 1 is configured such that a reformer 36 is provided with the blower 53 for feeding air to the reformer 36, making it possible to add the necessary amount of oxygen to the reformer 36 when the oxygen supplied from the cracking unit 20 is insufficient for ensuring that partial oxidation proceeds as desired in the reformer 36. It is also possible to adopt an arrangement in which all the oxygen needed to allow partial oxidation to proceed in the reformer 36 is fed in advance to the cracking unit 20 together with the mixed gas, as shown in FIG. 2(B). The rate at which air is fed to each unit should be properly controlled with consideration for the efficiency of the entire fuel cell system 10 because the rate at which oxygen is fed to the cracking unit 20 affects the activity (reaction rate) with which combustion and decomposition reactions proceed in the cracking unit 20, the formation of soot in the cracking unit 20, and other processes.

2-1-2. Steam Feed Rate and Soot Formation

Figure 2C:
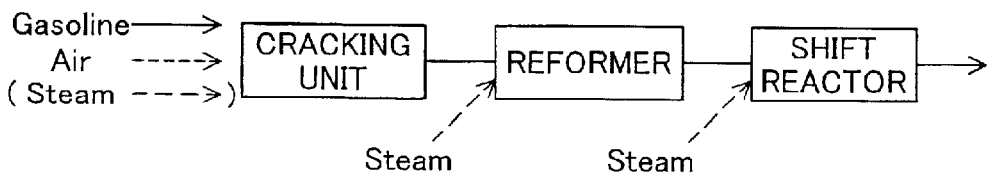

Steam controls the rate at which gasoline is combusted in the cracking unit 20, making it possible to make temperature increases less pronounced and to minimize soot formation by promoting the decomposition of gasoline-constituting hydrocarbons. The fuel cell system 10 shown in FIG. 1 is therefore configured such that the steam needed to perform steam reforming in the reformer 36 and the steam needed to perform the shift reaction in the shift reactor 37 are fed together with gasoline to the cracking unit 20 via an evaporator 34 (see FIG. 2(A)). It is also possible to reduce the rate at which steam is fed to the cracking unit 20 or to dispense with the feeding of steam to the cracking unit 20 altogether, provided soot formation in the cracking unit 20 remains within acceptable limits. The arrangement adopted in this case should envisage providing an evaporator similar to the evaporator 34 separately therefrom to vaporize the water from the water tank 32 with the aid of this evaporator and to feed the product directly to the reformer 36 and/or shift reactor 37, as shown in FIG. 2(C).

The presence of steam in the cracking unit 20 suppresses soot formation by reducing the residence time of the fluids in the cracking unit 20 in addition to suppressing soot formation by allowing smaller internal temperature increases. The rate at which steam is fed to the cracking unit 20 should be controlled with consideration for the effects of the steam fed to the cracking unit 20 such that the amount of soot formed in the cracking unit 20 remains within acceptable limits. When a specific amount of gas is fed to the cracking unit 20, the rate at which steam is fed to the cracking unit 20 can be controlled as the amount of steam contained in the gas to the amount of gasoline contained in the gas. This type of control may, for example, be accomplished by selecting a prescribed S/C setting, which is the ratio of the mole number of water atoms in the gas to the mole number of carbon atoms contained in the gasoline portion of the gas.

When steam is fed to the cracking unit 20, it is not necessary to feed the entire amount through the inlet portion of the cracking unit 20, and an arrangement can be adopted in which the steam is divided and fed to a plurality of locations along the direction of gas flow in the cracking unit 20, as described below. Feeding steam to the cracking unit 20 at separate flow positions in this manner makes it possible to improve the efficiency with which gasoline is pyrolyzed near the inlet portion of the cracking unit 20. Specifically, the steam fed through the inlet portion of the cracking unit 20 must be adequately preheated because pyrolysis does not proceed unless a specified high temperature is established. Feeding steam at separate flow positions dispenses with the need for some of the heat commonly used to heat up the steam before it is fed to the cracking unit 20, and allows this heat to be used to pyrolyze the gasoline near the inlet portion of the cracking unit 20. Alternatively, it is possible to use a smaller portion of heat for heating the steam before feeding it to the cracking unit 20, thus enhancing the energy efficiency of the entire apparatus. It is also possible to adopt a control routine whereby the amount of steam fed to the inlet portion is increased as a proportion of steam fed to the entire cracking unit 20, and excessive heating is minimized when the oxidation reactions proceeding at a fast rate near the inlet portion of the cracking unit 20 increase the risk of the temperature in the area near the inlet portion of the cracking unit 20 becoming unacceptably high and soot formation becoming more activate.

Oxygen and steam, which are required for the operation of the reformer 36, shift reactor 37, and other members downstream of the cracking unit 20, may be fed directly to each unit even when delivered from an area upstream of the cracking unit 20 in the above-described manner, but adopting an arrangement in which the desired amount of oxygen or stream can be fed separately to the reformer 36 and shift reactor 37 is preferred because the oxygen feed rate or steam feed rate can be controlled such that reactions are conducted in optimal conditions in the cracking unit 20, reformer 36, and shift reactor 37, respectively.

2-2. Effect of Providing Cracking Unit 20

In the fuel cell system 10 of the embodiment thus configured, a cracking unit 20 is disposed in front of the reformer 36, gasoline is pyrolyzed, and the resulting hydrogen material with a lower carbon number is used for reforming. It is therefore possible to minimize soot formation during reforming in the reformer 36, and to prevent the resulting soot from forming a coating on the surface of the reforming catalyst and inactivating the reforming reaction. For this reason, it is possible to prevent situations in which the performance of the entire fuel cell system 10 is adversely affected by the soot-induced inactivation of the reforming reaction.

Following is a description of soot formation in the reformer 36. Reforming is believed to involve dehydrogenation reactions in which hydrogen is removed from gasoline or another hydrocarbon-based fuel, as well as reactions in which the dehydrogenated carbon chains are more finely decomposed and bonded with oxygen to give carbon monoxide and carbon dioxide. In this case, using gasoline or another hydrocarbon-based fuel with a higher carbon number (longer carbon chains) as the reforming fuel promotes soot formation in the reformer. It is believed in this case that when a hydrocarbon-based fuel characterized by a high carbon number is involved, areas with a much higher proportion of carbon atoms than oxygen atoms form on the catalyst surface, reactions involving oxygen are less likely to proceed in a satisfactory manner in such areas, and carbon atoms react and bond with each other, promoting soot formation.

Consequently, the present embodiment is effective in suppressing soot formation in the reformer 36 because gasoline is decomposed to a lower carbon number before being reformed, making it possible to reduce the areas in which carbon atoms are present in greater proportions on the catalyst surface during reforming, to minimize bonding reactions among carbon atoms, and to facilitate bonding with oxygen atoms. Another feature of the present embodiment is that decomposing the hydrocarbon-based fuel in advance reduces the extent to which the carbon chains need to be decomposed during reforming and increases the efficiency of the overall reforming reaction occurring in the reformer. It is therefore possible to prevent situations in which unreformed fuel is discharged from the reformer 36 without being sufficiently reformed, to achieve better reforming with less reforming catalyst, and to adequately perform reforming reactions at lower temperatures. For this reason, the reformer can be made more compact, and a lower reforming temperature can be set for the reformer. Using a more compact reformer makes it possible to design the entire fuel cell system to smaller dimensions. Such improved compactness is particularly advantageous when the fuel cell apparatus is to be used as a power supply for energizing a vehicle or other moving body.

Another effect of placing a cracking unit 20 in front of the reformer 36 is the ability to control situations in which the reforming fuel is adsorbed on the surface of the reforming catalyst in the reformer 36, causing catalyst poisoning. The probability that a hydrocarbon-based fuel will be absorbed on the surface of a reforming catalyst increases with an increase in the length of its carbon chain. Situations in which reforming reactions are deactivated by the adsorption of reforming fuel on the surface of a reforming catalyst can therefore be prevented by pyrolyzing gasoline before it is fed to the reformer 36, and feeding a hydrocarbon with a lower carbon number as a reforming fuel to the reformer 36, as is the case with the present embodiment.

The effect of decomposing gasoline prior to reforming remains the same and does not depend on the type of reforming reaction occurring in the reformer 36 or the type of reforming catalyst used in the reformer 36. Although the above embodiment is described with reference to a case in which partial oxidation accompanied steam reforming in the reformer 36, the same effect can be obtained by decomposing a hydrocarbon-based fuel with a high carbon number and reforming the product when hydrogen is obtained primarily as a result of hydrogen reforming or partial oxidation.

2-3. Modification of Cracking Unit 20

2-3-1 Catalyst Utilization

The combustion (oxidation) and decomposition reactions in the cracking unit 20 occur when the temperature inside a reactor vessel is kept at a specified high level (for example, about 800–1000° C.) and the gasoline and oxygen are supplied therein. The cracking unit 20 can also be filled with a catalyst sufficiently active to promote these reactions in order to further increase the efficiency of the reactions. The cracking unit 20 can be made even more compact by providing such a catalyst. Providing the cracking unit 20 with a catalyst can be effective for increasing the overall efficiency of the reactions occurring in the cracking unit 20 as long as this catalyst is sufficiently active to promote the combustion and/or decomposition of gasoline and other hydrocarbon-based fuels. Examples of catalysts suitable for the cracking unit 20 include noble metal catalysts, nickel catalysts, cobalt catalysts, perovskite catalysts, and hexaaluminate catalysts. Alumina, ceria, zirconia, titania, and the like may be used as catalyst carriers when noble metal catalysts are employed.

A catalyst sufficiently active to promote combustion reactions should be disposed at least in the inlet portion of the cracking unit 20. With this arrangement, combustion is promoted and the internal temperature raised in the inlet portion of the cracking unit 20, making it possible to promptly start a decomposition reaction with adequate activity and to subsequently perform a combustion reaction with sufficient activity.

2-3-2. Utilization of Low-Temperature Plasma

The cracking unit 20 may also be provided with a plasma generator for generating a low-temperature plasma in order to be able to perform the aforementioned decomposition reaction at a lower temperature. The cracking unit 20 can be made even more compact by providing a plasma generator and allowing the reaction occurring in the cracking unit 20 to proceed with greater efficiency at a lower temperature. In addition, soot formation in the cracking unit 20 can be minimized because the reaction can be conducted at a lower temperature than when the process is carried out in a gas phase or over a catalyst without the use of a plasma. The reactions occurring in the cracking unit 20 can be rendered more efficient as long as the plasma generator provided to the cracking unit 20 forms a discharge (such as a corona, surface, or ozonizer discharge) across a dielectric between electrodes such that a plasma is formed along the entire conduit for transporting the gas feed.

The decomposition of gasoline in the cracking unit 20 (the level to which the carbon number of the hydrocarbon involved is reduced by decomposition) is determined by the settings adopted for the residence time of the fluids in the cracking unit 20 (gas flow rate or volume of the cracking unit 20), the reaction rate (based on the reaction temperature or the like), the catalyst or plasma generator provided to the cracking unit 20, or the like. A hydrocarbon with a lower carbon number can be obtained by adjusting the oxygen feed rate or reaction temperature of the cracking unit 20 and activating the reactions in the cracking unit 20. The lower the carbon number of the hydrocarbon fed to the reformer 36, the easier it is to suppress soot formation in the reformer and to render the reforming reaction more efficient. However, increased reaction activity in the cracking unit 20 makes it more likely that soot will be formed in the cracking unit 20 or that the reforming reaction of the entire apparatus will become less efficient, as described above. It is therefore concluded that the conditions established in the cracking unit and related to the degree to which gasoline is to be decomposed should be selected with consideration for the effect obtained by gasoline decomposition and for the undesirable phenomena produced by activating the reactions in the cracking unit 20, and it is decided in connection with the present embodiment that the operating conditions for the cracking unit 20 should be established such that gasoline is decomposed to obtain a hydrocarbon whose carbon number is 4 or less.

2-3-3. Utilization of Temperature Distribution Averaging Means

It is also advantageous to provide the cracking unit 20 with a temperature distribution averaging means for averaging out the temperature distribution in the interior. Feeding gasoline and air from an area upstream of the cracking unit 20 causes the gasoline to be vigorously combusted near the inlet portion of the cracking unit 20 and creates a temperature peak near this inlet portion because the reaction rate of gasoline combustion is higher than that of gasoline decomposition. Heat evolved by the rapid combustion reaction near the inlet portion is carried downstream by the gas stream passing through the cracking unit 20, and this heat is used for gasoline decomposition. Heat evolved near the inlet portion will be transmitted downstream more rapidly than when the gas stream alone is used if the cracking unit 20 is provided with a temperature distribution averaging means for transmitting combustion-generated heat downstream by heat transfer. It is therefore possible to activate gasoline decomposition by raising the temperature on the downstream side, and to enhance the overall efficiency of the decomposition reactions occurring in the cracking unit 20. The cracking unit 20 can be made more compact by raising the efficiency of the decomposition reactions. In addition, heat generated near the inlet portion can be transmitted downstream at a faster rate, making it possible to control situations in which the area near the inlet portion (where vigorous combustion reactions occur) is heated to an unacceptable temperature, and to prevent situations in which soot formation is induced by the excessive heating of the area near the inlet portion.

The temperature distribution averaging means provided to the cracking unit 20 may, for example, have a construction in which a porous metal, a foamed flow-through metal, a honeycomb, or other structure is extended inside the cracking unit 20 from the area near the inlet portion to a specified downstream location. With this construction, the heat generated by the combustion reaction occurring near the inlet portion can be transmitted downstream by the walls of the porous metal, foamed flow-through metal, honeycomb, or the like, yielding the above-described effect. The temperature distribution averaging means may have a porous metal, a foamed flow-through metal, a honeycomb, or any other structure whose walls have sufficient surface area for transmitting heat through solid material and providing a better effect by transmitting heat more rapidly than that through vapor.

In addition, providing the cracking unit 20 with a porous metal, a foamed flow-through metal, a honeycomb, or other structure has the effect of improving the miscibility of gases fed to the cracking unit 20 in addition to demonstrating the aforementioned heat-transfer effect. Specifically, gases fed to the cracking unit 20 diffuse by impinging on the inlet edges of the porous metal, foamed flow-through metal, honeycomb, or other structure disposed upstream of the cracking unit 20, allowing gas components to be kept in a more uniform state. In particular, the effect of mixing the gases with greater uniformity by employing the aforementioned diffusion is enhanced when gasoline, air, and steam are fed separately to the cracking unit 20.

Figure 2D:
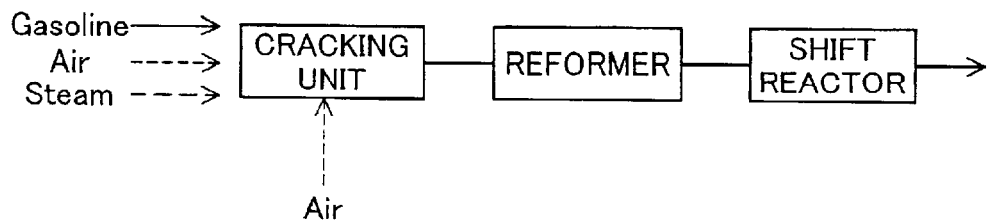

In another means for averaging out the temperature distribution in the cracking unit 20, heated oxygen (air) is fed at separate flow positions in the cracking unit 20. Specifically, the fuel cell system 10 shown in FIG. 1 is described with reference to a case in which oxygen is fed to the cracking unit 20 such that the entire amount thereof is supplied through the inlet portion via the fuel gas conduit 74, but it is also possible for part of the oxygen to be fed downstream of the cracking unit 20, as shown in FIG. 2(D). Gasoline combustion, which is an exothermic reaction, proceeds vigorously in the area to which oxygen is supplied, so feeding oxygen at separate positions in this manner makes it possible to disperse the gas across the area of vigorous combustion and to average out the temperature distribution.

Divisional supply of gasoline may also be adopted in addition to the divisional supply of oxygen. Alternatively, gasoline alone can be fed at separate flow positions when sufficient amount of oxygen is fed through the inlet portion of the cracking unit 20. In this case as well, the same effect can be achieved by dispersing the material across the area of vigorous combustion and averaging out the temperature distribution. When oxygen or gasoline is fed at separate flow positions according to this arrangement, the extent of separation is not limited to the two stages shown in FIG. 2(D), and a better effect of peak temperature suppression can be obtained as the number of separations is increased. The number of separations should be appropriately selected with consideration for line complexity and other factors.

The divisional supply of fluids to the cracking unit 20 can be realized by a piping system that includes a plurality of branch pipes, connected to the cracking unit 20, each having a pump or a control valve for controlling the flow rate at each branch pipe.

2-3-4. Temperature Increase Promoting Means for Cracking Unit 20

It is important to rapidly raise the temperature of the gas being fed through the inlet portion of the cracking unit 20 to a level at which the decomposition reaction is sufficiently active, in order for raising reaction efficiency in the cracking unit 20 when gasoline is decomposed in the cracking unit 20. Specifically, the internal temperature is gradually increased and a decomposition reaction rendered more active by initiating gasoline combustion in the inlet portion of the cracking unit 20. An even higher level of decompositional activity can be achieved by reducing the heating time for the area near the inlet portion of the cracking unit 20 and contracting the area being heated to the desired level.

Providing the inlet portion of the cracking unit 20 with a heater or other heating means can be cited as an example of a method for reducing the heating time for the inlet portion of the cracking unit 20. It is also possible to completely oxidize (completely combust) gasoline in the area near the inlet portion of the cracking unit 20, and to use the heat produced by the complete oxidation reaction. Such an arrangement is shown in FIG. 3.

Figure 3:
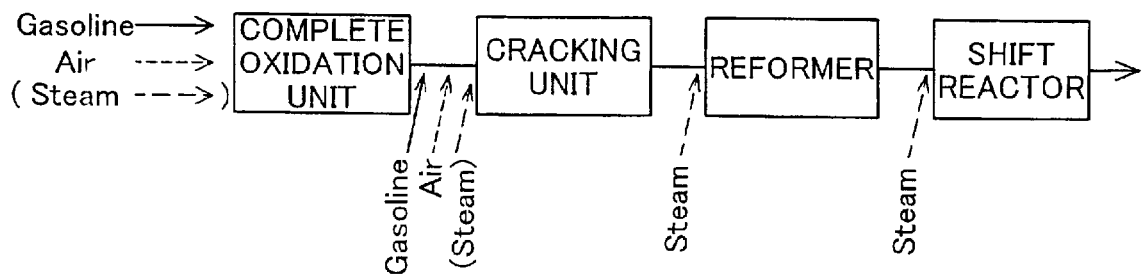
FIG. 3 is a diagram depicting an additionally provided complete oxidation unit.

FIG. 3 depicts an arrangement in which a complete oxidation unit for effecting complete gasoline oxidation is provided upstream of the cracking unit 20. The complete oxidation unit is supplied with gasoline (which is needed to produce the desired heat) and oxygen (whose amount must be sufficient for complete oxidation), and the high-temperature gas generated in the complete oxidation unit by the complete oxidation of the gasoline thus fed is introduced into the cracking unit 20. Gasoline and air are also fed through the inlet portion of the cracking unit 20. The high-temperature gas from the complete oxidation unit is thus fed to the cracking unit 20 together with the gasoline and air used for the reactions occurring in the interior, making it possible to promptly heat up the inlet portion and to perform decomposition and combustion (partial oxidation) rapidly and actively.

Although the complete oxidation unit is shown in FIG. 3 as an entity seperate from the cracking unit 20, it is also possible to adopt an approach in which the two are integrally formed, the gasoline and air used for complete oxidation are fed through the inlet portion of the cracking unit 20, and the gasoline and air used for partial oxidation and decomposition are fed further downstream. In a construction featuring such complete oxidation, the steam may be fed through either the inlet portion of the complete oxidation unit or the inlet portion of the cracking unit 20. The steam may also be fed through the inlet portion of the reformer. The rate at which the gases are fed to each unit should be appropriately set with consideration for the quantity of heat needed to raise the steam temperature before the steam is subjected to the aforementioned reactions, the extent of soot formation in the cracking unit 20, and the amount of steam needed for reforming.

In a construction in which sufficient heat can be evolved in the complete oxidation unit (or in an upstream area within the cracking unit 20) in this manner, it is possible to decompose gasoline alone without performing the combustion reaction (which is a partial oxidation reaction) inside the cracking unit 20 (or in a downstream area within the cracking unit 20). In such a case, no air is transported between the complete oxidation unit and the cracking unit 20, or the air is fed in a sufficiently small amount to prevent combustion in the cracking unit 20.

The construction in which the cracking unit 20 is provided with such temperature increase promoting means can speed up warming during the startup of a fuel cell system, and is therefore particularly advantageous for a fuel cell system subject to repeated starting and stopping.

The hydrocarbon obtained by decomposing gasoline in the cracking unit 20 is reformed in the reformer 36. A catalyst based on platinum or another noble metal can be selected as the reforming catalyst for the reformer 36. The reforming catalyst should be appropriately selected and the temperature of the reforming reaction appropriately controlled to allow hydrocarbons to be efficiently reformed in accordance with the degree to which gasoline is to be decomposed in the cracking unit 20 (the degree to which the carbon number is to be reduced). Such a construction allows reforming reactions to be performed with high efficiency and the reformer to be made more compact. In the present embodiment, the conditions for the combustion and decomposition reactions in the cracking unit 20 are set such that the carbon number of the hydrocarbon obtained by gasoline decomposition is reduced to 4 or less, and the temperature of the reforming reaction and the type of reforming catalyst provided to the reformer 36 are selected in conformity with the hydrocarbon whose carbon number is 4 or less.

Figure 4:
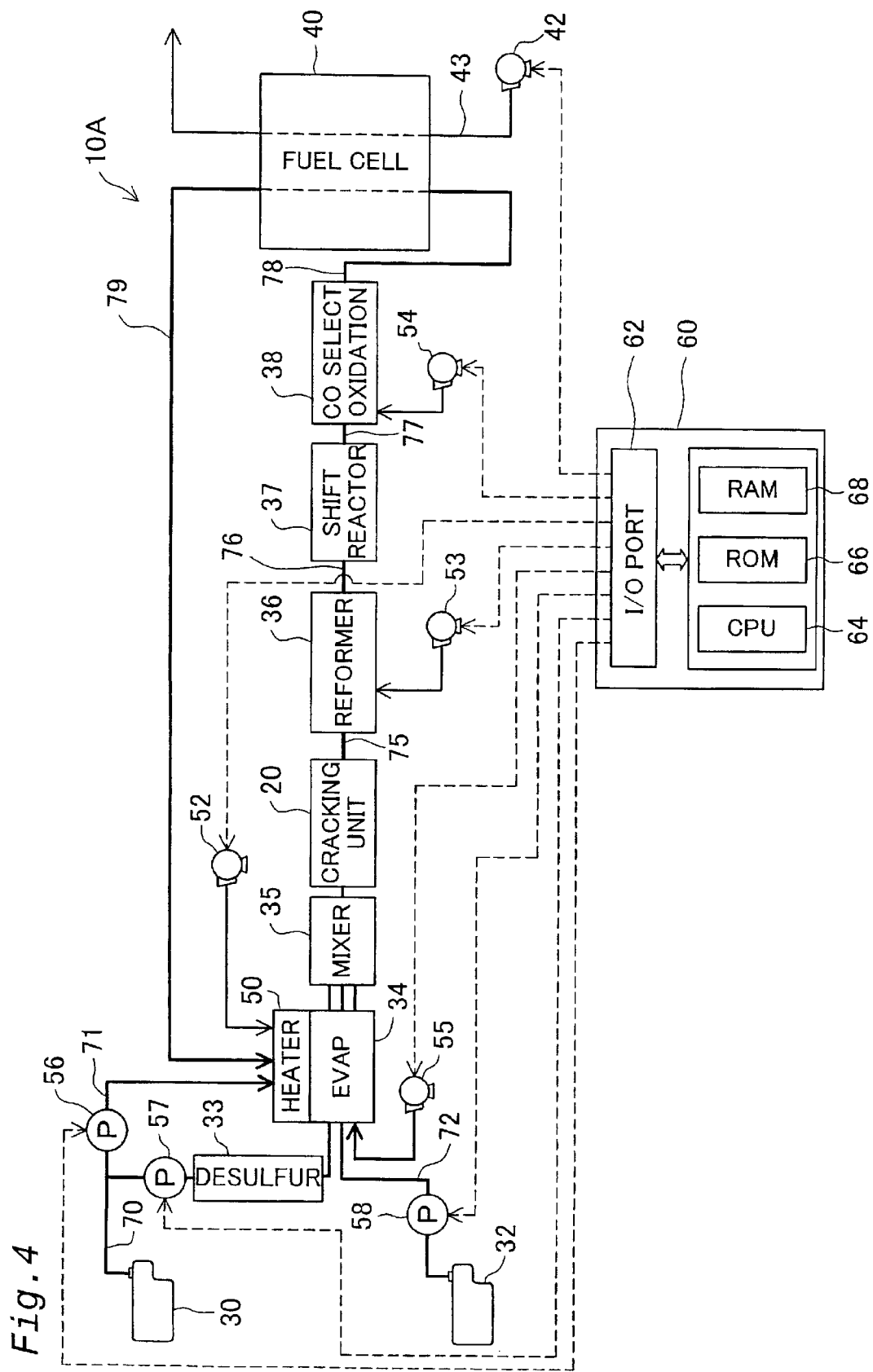
FIG. 4 is a diagram depicting the structure of a fuel cell system 10A.

Although the fuel cell system 10 shown in FIG. 1 is described with reference to a case in which gasoline and water are mixed before being fed to the evaporator 34, it is also possible to adopt an arrangement in which gasoline and water are individually heated and vaporized, and are then mixed before being fed to the cracking unit 20. The fuel cell system 10A thus configured is shown in FIG. 4. In the fuel cell system 10A, gasoline and water are individually heated and vaporized in the evaporator 34. The air supplied by the blower 55 is also heated in the evaporator 34. In the fuel cell system 10A, a mixing unit 35 is interposed between the evaporator 34 and the cracking unit 20, and the gasoline, steam, and air heated/vaporized in the evaporator 34 are fed to the cracking unit 20 after being mixed in the mixing unit 35. The air supplied by the blower 55 may also be fed to the mixing unit 35 without being passed through the evaporator 34.

The mixing unit 35 is a device designed to uniformly mix these gases. Providing a device for uniformly mixing gases allows the mixing to be performed in a more reliable manner and the gas components fed to the cracking unit 20 to be provided with a higher degree of uniformity than when the aforementioned fluids are mixed as liquids or as liquids and gases. An arrangement in which a foam or other porous member is disposed inside the mixing unit 35 can be cited as an example of a structure designed to allow gases to be uniformly mixed in the mixing unit 35. This structure also allows the gases passing through the interior to be diffused more rapidly and a more uniform mixture to be obtained. Alternatively, gas mixing can be facilitated by causing the gas stream passing through the cracking unit 20 to form swirls (rotary streams). When multiple types of gases are fed to the mixing unit 35, it is possible to create jets by feeding at least one type of gas under pressure, and to facilitate mixing by utilizing impact diffusion. It is also possible to provide a stirring device by installing a fan inside the mixing unit 35 and rotating or otherwise actuating the fan to facilitate gas mixing by mechanical means. In another possible arrangement, a porous metal, a foamed flow-through metal, a honeycomb, or other structure (see above) is extended downstream from the inlet portion of the cracking unit as a temperature distribution averaging means, this structure is used for the uniform mixing of the aforementioned gases, and a structure corresponding to the mixing unit 35 is formed integrally with the cracking unit.

3. Reaction Control in Cracking Unit Under Variable Load

When the load connected to the fuel cell 40 in the fuel cell system 10 of the above-described embodiment remains substantially constant, gasoline can be decomposed with the desired degree of stability by selecting specified constant conditions for the gas feed rate, reaction temperature, and other operating conditions related to the gasoline, air, and other fluids supplied to the cracking unit 20. When, however, there are variations in the load connected to the fuel cell 40, it is necessary to control the operating conditions of the cracking unit 20 in accordance with the load variations in order to decompose the gasoline with the desired degree of stability.

When the load increases, air is fed at a higher rate into the cracking unit 20, and the residence time of the fluids in the cracking unit 20 decreases as a result. Conversely, the residence time of the fluids in the cracking unit 20 increases when the load decreases. Consequently, a short residence time results in inadequate pyrolysis when the load is low, creating a risk that it will be impossible to adequately decompose gasoline to the desired extent (for example, to a carbon number of about 4 or less). Such inadequate gasoline decomposition makes it more likely that an unacceptably large amount of soot will form in the reformer 36 or that the efficiency of reforming reactions will fall to an unacceptable level in the fuel cell system 10, which is implemented on the premise of using a hydrocarbon whose carbon number is about 4 or less. In addition, the residence time of the fluids in the cracking unit 20 increases when the load decreases, with the result that excessive oxidation occurs, an oxygen deficiency is created, and an unacceptably large amount of soot is formed in the cracking unit 20. Consequently, gasoline can always be adequately decomposed to the desired extent even under a varying load, and soot can be prevented from forming in the cracking unit 20 by controlling the reaction residence time or reaction rate in accordance with the load variations in the cracking unit 20. Following is a description of a routine for controlling the cracking unit 20 in accordance with such load variations.

3-1. Reaction Rate Control 3-1-1. Control Based on Oxygen Feed Rate

Controlling the reaction rate of the cracking unit 20 can be cited as an example of a method for preventing situations in which inadequate pyrolysis occurs under a high load or in which soot formation increases under a low load. Specifically, adequate pyrolysis can be performed in the cracking unit 20 by raising the reaction rate under a high load, and an oxygen deficiency can be prevented from developing in the cracking unit 20 (and soot formation can be suppressed) by reducing the reaction rate under a low load.

One way of controlling the reaction rate is to control the oxygen feed rate. An increase in the ratio of oxygen to the gasoline fed to the cracking unit 20 (the O/C value described above) will activate the combustion reaction, thereby increasing the rate of the entire reaction occurring in the cracking unit 20. A decrease in the O/C value will reduce the activity of the combustion reaction, thereby reducing the rate of the entire reaction occurring in the cracking unit 20. Gasoline can therefore be adequately decomposed, and soot prevented from forming in the cracking unit 20, by setting up a control routine whereby the O/C value is increased when the load increases, and reduced when the load decreases.

Figure 5:
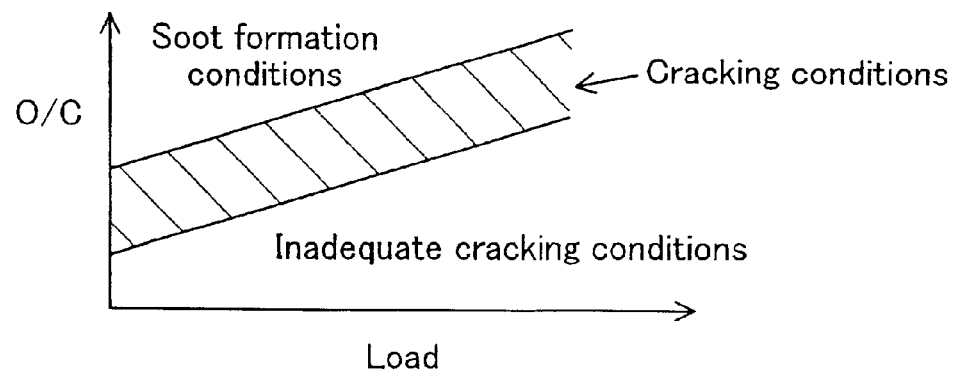
FIG. 5 is a diagram depicting the relation between the magnitude of the load and the desired O/C value.

FIG. 5 is a diagram depicting the relation between the magnitude of the load connected to the fuel cell 40 and the O/C value needed to maintain adequate reaction activity in the cracking unit 20 while suppressing soot formation. It can be seen in FIG. 5 that the O/C value associated with conditions (referred to hereinbelow as "cracking conditions") that allow adequate reaction activity to be maintained while suppressing soot formation increases with increased load and has a specified proper range that depends on the magnitude of the load. When the O/C value is below the proper cracking condition range shown in FIG. 5, the reactions occurring in the cracking unit 20 become inadequate, and when the O/C value exceeds the proper cracking condition range, an unacceptable amount of soot is produced by excessively active combustion reactions, as described above.

Thus, the fuel cell system 10 of the present embodiment is configured such that the O/C value of the cracking unit 20 is kept within a range of 0.2–1.2 in accordance with the magnitude of the load connected to the fuel cell 40. Although FIG. 5 depicts a relation involving the desired O/C value in which the magnitude of the load is plotted on the horizontal axis, results identical to those in FIG. 5 can be obtained for a relation involving the desired O/C value when the variable plotted on the horizontal axis is a load-based gasoline feed rate (rate at which gasoline is fed to the cracking unit 20), or the total flow rate at which gases are fed to the cracking unit 20.

The extent of control adopted for varying the O/C value under a varying load should be appropriately selected in accordance with the performance or other properties of the cracking unit 20. To satisfy the conditions in FIG. 5, it is possible to adopt an arrangement in which an O/C value is set in accordance with the load, and the O/C value is then modified in steps as the load varies. In another arrangement, an O/C value above or below a basic O/C value is adopted when the load moves above or below a specified level. An O/C value in response to the varying load can, for example, be obtained by adopting a control routine in which predetermined O/C values are stored as maps in the control unit 60 in accordance with all possible magnitudes of the load connected to the fuel cell 40, and these maps are referenced while information about the load magnitudes is entered.

Situations might be envisioned in which the aforementioned load-related control of the O/C value fails to yield sufficient responsiveness when the O/C value is controlled in response to significant load variations. Such situations are apt to create a temporary excess of oxygen. It is therefore preferable to adopt an arrangement that allows oxygen (air) to be supplementally added to the cracking unit 20 at a downstream position in addition to the mixed gas supplied by the evaporator 34 and the oxygen fed through the inlet portion on the upstream side (see FIG. 2(D)), so situations in which an oxygen deficiency is created in the cracking unit 20, the reactions fail, and soot is formed can be prevented by supplementally adding oxygen as reactions proceed in the cracking unit 20.

When oxygen is supplementally added as reactions proceed in the cracking unit 20, it is possible to adopt an arrangement in which the cracking unit 20 is provided with an internally disposed oxygen sensor (which may, for example, be located in the middle or near the outlet portion of the cracking unit 20), and an oxygen deficiency is detected by sensing the concentration of oxygen in the gas passing through the cracking unit 20; or an arrangement in which the cracking unit 20 is provided with an internally disposed oxygen sensor, and an oxygen deficiency is detected and oxygen is supplementally added when the internal temperature falls below a specified level, as shown in FIG. 2(D). Whereas the temperature distribution inside the cracking unit 20 can be averaged out with high efficiency by employing the above-described structure for feeding oxygen at separate positions, an oxygen deficiency can be prevented using a structure in which the amount of oxygen supplied at a location downstream of the inlet portion is further controlled based on the oxygen concentration thus sensed or the temperature inside the cracking unit 20. The O/C value can thus be corrected for the interior of the cracking unit 20, preventing an oxygen deficiency from developing. Oxygen can be supplementally added to the cracking unit 20 at a plurality of locations along the direction of gas flow in the cracking unit 20.

3-1-2. Control During Plasma Utilization

Providing the cracking unit 20 with the above-described plasma generator and controlling the voltage applied during plasma generation can be cited as an example of another method for controlling the rate of the reactions occurring in the cracking unit 20 and bringing this rate in line with load variations. Raising the voltage applied during plasma generation can promote decomposition in the cracking unit 20 in the same manner as controlling the aforementioned O/C value. In addition, lowering the applied voltage makes it possible to control decomposition in the cracking unit 20. Gasoline can therefore be adequately decomposed and soot can be prevented from forming in the cracking unit 20 by means of a control routine in which the voltage applied to the plasma generator is raised when the load increases and lowered when the load decreases.

When the cracking unit 20 is provided with a plasma generator and gasoline decomposition is controlled by means of the voltage applied to the plasma generator, the same relation as in FIG. 5 is obtained between the magnitude of the load connected to the fuel cell 40 and the applied voltage needed to maintain adequate reaction activity in the cracking unit 20 while suppressing soot formation. The applied voltage would be plotted instead of the O/C value on the vertical axis of FIG. 5. Specifically, applied voltage associated with proper cracking conditions that allow adequate reaction activity to be maintained while suppressing soot formation increases with increased load and has a specified range that depends on the magnitude of the load. The operation in which the applied voltage is controlled in accordance with load variations is identical to the operation in which the O/C value is modified in accordance with load variations.

In a structure in which the cracking unit 20 is provided with a plasma generator, feeding steam to the cracking unit 20 in the above-described manner causes OH radicals to be formed from water molecules decomposed by the plasma in the cracking unit 20 and allows these highly reactive OH radicals to be utilized in the reaction involving carbon atoms (which contain molecules resulting from gasoline decomposition) in the cracking unit 20. It is therefore possible to suppress reactions in which carbon atoms form bonds with each other, and to achieve an excellent effect in terms of suppressing soot formation.

3-1-3. Control Based on Gas Feed Temperature

Although the above description involved controlling the rate at which oxygen is fed to the cracking unit 20 or controlling the voltage applied during plasma application, it is also possible to control the temperature of the gas fed to the cracking unit 20, and thus to control the rate of the reactions occurring in the cracking unit 20 and to successfully respond to load variations. The temperature of the gas fed to the cracking unit 20 can be adjusted by varying the degree of heating in the evaporator 34, which is part of the fuel cell system 10 shown in FIG. 1. Specifically, the temperature of the gas fed to the cracking unit 20 can be raised or lowered by increasing or reducing the rates at which gasoline and anode off-gas are fed as combustion fuel to the heater 50 provided with a combustion catalyst.

Consequently, the reactions occurring in the cracking unit 20 are activated and situations in which inadequately pyrolyzed gasoline is fed to the reformer 36 are prevented by increasing the rate at which combustion fuel is fed to the heater 50 and raising the gas temperature when the load increases. Furthermore, the combustion and pyrolysis reactions occurring in the cracking unit 20 can be slowed down and situations in which an oxygen deficiency is created in the cracking unit 20 and soot is formed can be prevented by reducing the rate at which combustion fuel is fed to the heater 50 and lowering the gas temperature when the load decreases.

In the fuel cell system 10 shown in FIG. 1, gasoline and water are fed to the cracking unit 20 via the evaporator 34, so both the gasoline and the water fed to the cracking unit 20 change their temperatures in response to a control action affecting the rate at which combustion fuel is fed to the heater 50. It is also possible in this case to adopt an arrangement in which the gasoline and water are fed to the cracking unit 20 after being heated by separate heating means, respectively. In such cases, the degree to which the gasoline and/or water is heated can be controlled in accordance with the load. Alternatively, it is possible to provide means for heating the air supplied by the blower 55 and to control the degree to which the air is heated in accordance with the load. The aforementioned effect of controlling the gas temperature can be achieved by adopting an arrangement in which the temperature is controlled at least for one of the fluids fed to the cracking unit 20, and the temperature of the fluid fed to the reaction zone in the cracking unit 20 is ultimately adjusted in accordance with the load.

3-2. Controlling Residence Time in Cracking Unit 3-2-1. Controlling Pressure in Cracking Unit 20

Although the above description is given with reference to a case in which the reaction rate in the cracking unit 20 is controlled and brought in line with load variations, it is also possible to control residence time as reactions proceed in the cracking unit 20. An adequate decomposition reaction can be performed by adopting a control routine in which the residence time is extended when the load is large. An oxygen deficiency can be prevented and soot formation inhibited by adopting a control routine in which the residence time is reduced when the load is small. Controlling the pressure inside the cracking unit 20 can be cited as an example of a method for controlling the residence time.

Residence time is the time needed to completely replace the material (material contained in the gas being fed) in a specified device (cracking unit 20). The residence time of the cracking unit 20 can therefore be calculated by dividing the volume of the cracking unit 20 by the volume flow rate at which the gas is fed to the cracking unit 20. If the total mass of gas fed to the cracking unit 20 remains constant, any increase in the pressure inside the cracking unit 20 will reduce the volume flow rate at which the gas is fed to the cracking unit 20, resulting in a longer residence time. Conversely, a reduction in the pressure of the cracking unit 20 will increase the volume flow rate at which the gas is fed to the cracking unit 20, resulting in a shorter residence time (assuming that the total mass of gas fed to the cracking unit 20 remains the same.

For this reason, residence time should be extended by raising the pressure inside the cracking unit 20 when the load increases, making it possible to prevent inadequately pyrolyzed gasoline from being fed to the reformer 36. In addition, residence time should be reduced by lowering the pressure inside the cracking unit 20 when the load decreases, making it possible to prevent situations in which the reactions advance too far, an oxygen deficiency is created, and soot is formed.

The pressure in the cracking unit 20 can be controlled by providing a pressure-adjusting valve to the inlet portion for feeding gases to the cracking unit 20, or to the outlet portion for discharging gases from the cracking unit 20. Alternatively, a single pressure-adjusting valve can be used to concurrently control the pressure of the reactors including the cracking unit 20, the reformer 36, the shift reactor 37, and/or the CO selective oxidation unit, rather than to merely adjust the pressure inside the cracking unit 20. Internal pressure can be simultaneously controlled in this manner if the residence time of each unit remains within the allowable limits. When the internal pressure of a plurality of members that include the cracking unit 20 is simultaneously controlled using a single pressure-adjusting valve, this pressure valve may be provided to the outlet portion of one reactor disposed downstream of the cracking unit 20. Because the operating temperature is lower in the reactors disposed downstream of the cracking unit 20, this structure is preferred because it dispenses with the need for providing a pressure-adjusting valve capable of operating in high-temperature environment such as the cracking unit 20, and allows widely available low-temperature pressure-adjusting valves to be used.

3-2-2. Control Based on Steam Flow Rate

A method for controlling the flow rate of steam to the cracking unit 20 may be used to control the residence time of the cracking unit 20. As described above, the steam fed to the reaction zone in the cracking unit 20 has the effect of preventing sudden temperature increases, promoting the decomposition of gasoline-constituting hydrocarbons, and suppressing combustion. Steam is therefore fed together with gasoline and air to the cracking unit 20 of the fuel cell system 10 according to the embodiment shown in FIG. 1. In this structure, raising the flow rate of steam to the cracking unit 20 increases the overall amount of gas fed to the cracking unit 20 (for example, increases the volume flow rate at constant pressure) and reduces the residence time. Consequently, the flow rate of steam to the cracking unit 20 should be increased and the residence time reduced when the load decreases, making it possible to prevent situations in which the reactions advance too far, an oxygen deficiency is created, and soot is formed. In addition, the flow rate of steam to the cracking unit 20 should be reduced and the residence time extended when the load increases, making it possible to prevent inadequately pyrolyzed gasoline from being fed to the reformer 36.

Feeding steam to the cracking unit 20 at a higher flow rate results in a shorter residence time and a smaller combustion-induced temperature increase for the cracking unit 20. Consequently, feeding steam at a higher rate under reduced load has the effect of producing a smaller temperature increase in addition to the effect of reducing the residence time, making it possible to prevent situations in which the reactions proceed too far and an oxygen deficiency is created. The flow rate of steam can be expressed as an S/C value described before. In the fuel cell system 10 of the present embodiment, the S/C value is kept within a range of 0–3 in accordance with the magnitude of the load connected the fuel cell 40.

3-2-3. Volume Control of Cracking Unit 20

The residence time of the cracking unit 20 can also be controlled by varying the volume of the space (referred to hereinbelow as "cracking unit volume") in which actual reactions proceed in the cracking unit 20. The cracking unit volume should be reduced and the residence time shortened when the load decreases. The cracking unit volume should be increased and the residence time extended when the load increases.

Figure 6:
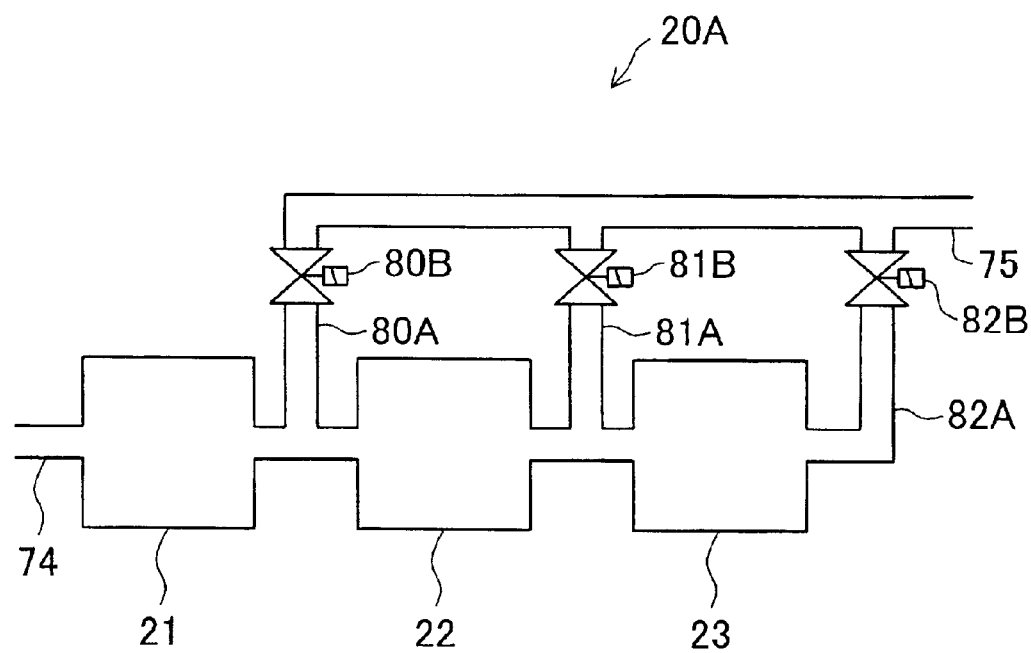
FIG. 6 is a diagram schematically depicting the structure of a cracking unit 20A with a variable cracking unit volume.

FIGS. 6 to 10 depict examples of structures capable of accommodating the cracking unit 20 provided to the fuel cell system 10 of the present embodiment in order to allow the cracking unit volume to be varied. FIG. 6 is a diagram schematically depicting a cracking unit 20A with a variable cracking unit volume. The cracking unit 20A comprises a first reaction chamber 21, a second reaction chamber 22, and a third reaction chamber 23. The reaction chambers 21–23 are connected in series in this order from the side of a fuel gas conduit 74. An air-containing mixed gas is supplied from the fuel gas conduit 74 to the first reaction chamber 21. Gas discharge lines 80A, 81A, and 82A are connected to the first, second, and third reaction chambers 21, 22, and 23, respectively; and these gas discharge lines are connected to a fuel gas conduit 75 in communication with the reformer 36. The gas exhaust lines are provided with valves 80B, 81B, and 82B, respectively.

The conduits for feeding gases to the cracking unit 20A can therefore be switched by these valves. Specifically, opening the valve 80B and closing the valves 81B and 82B will allow the gas fed to the cracking unit 20A to be discharged from the fuel gas conduit 75 via the gas exhaust line 80A without being passed through the second reaction chamber 22 or third reaction chamber 23 after being combusted and pyrolyzed in the first reaction chamber 21. In addition, opening the valve 81B and closing the valves 80B and 82B will allow the gas in the cracking unit 20A to be discharged from the fuel gas conduit 75 via the gas exhaust line 81A without being passed through the third reaction chamber 23 after being combusted and pyrolyzed in the first reaction chamber 21 and second reaction chamber 22. Opening the valve 82B and closing the valves 80B and 81B will allow the gas fed to the cracking unit 20A to be discharged from the fuel gas conduit 75 via the gas exhaust line 82A after being combusted and pyrolyzed in the three reaction chambers.

The valves 80B–82B are connected to the control unit 60 and are opened and closed by drive signals from the control unit 60. In the fuel cell system provided with the cracking unit 20A, the number of reaction chambers to be used is set in advance in accordance with the magnitude of the load in order to keep the residence time of the fluids in the cracking unit at a more desirable level. The control unit 60 operates on the principle that the valves are opened and closed in accordance with the magnitude of the load, and the conduits for passing gases through the cracking unit 20A are controlled such that only the desired number of reaction chambers are employed to adjust the cracking unit volume (residence time).

Figure 7:
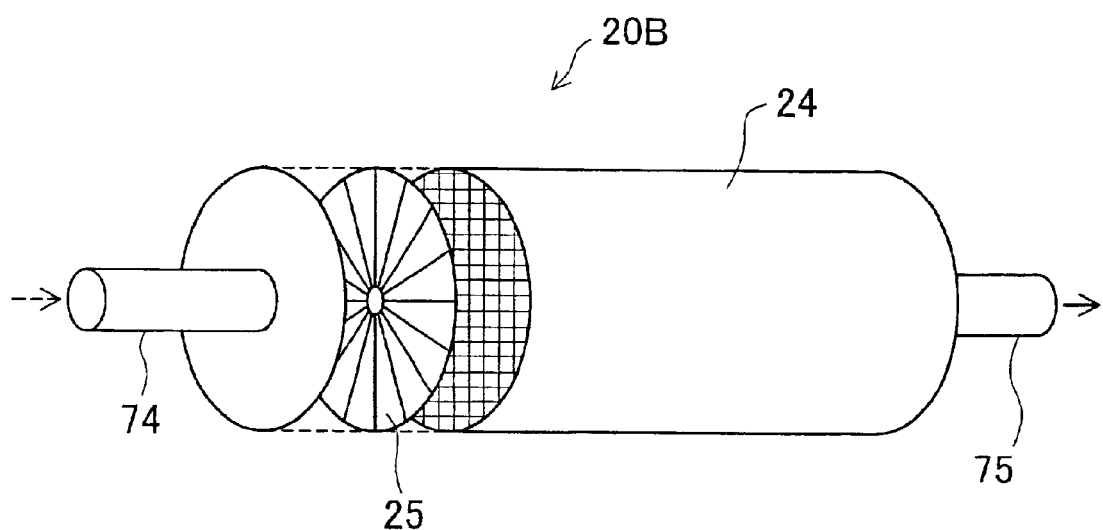
FIG. 7 is a diagram depicting the structure of a cracking unit 20B with a variable cracking unit volume.
Figure 8:
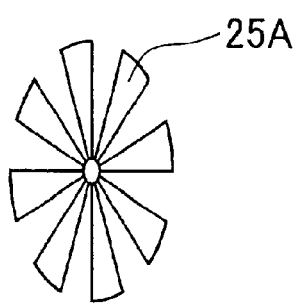
FIG. 8 is a diagram depicting the shape of the mask 25A provided to the cracking unit 20B.

FIG. 7 is a diagram schematically depicting the structure of a cracking unit 20B, which is another example of a device with a variable cracking unit volume. In the cracking unit 20B, a adjustable mask 25 is provided on the inlet side of a reaction chamber 24 formed by a honeycomb tube. The adjustable mask 25 comprises two impeller-type half mask plates 25A, as the one shown in FIG. 8. The half mask plates 25A are brought into contact with the end portion of the honeycomb tube on the inlet side thereof and are supported while at least one plate is allowed to rotate about a shaft (not shown) provided substantially in the cross-sectional central portion of the inlet for the reaction chamber 24. The air-containing mixed gas supplied through the fuel gas conduit 74 cannot reach the regions of a honeycomb whose end portions are shielded by the adjustable mask 25, and the number of cells in the honeycomb tube that are capable of receiving the mixed gas can be increased or reduced by varying the extent to which the mask plates 25A overlap each other. The inlet portion of the reaction chamber 24 is completely closed (0% opening) when the two mask plates 25A do not overlap at all, and the number of cells in the honeycomb tube that can receive the reforming gas reaches its maximum (100% opening; longest residence time) when the two mask plates 25A completely overlap each other. The adjustable mask 25 is connected to the control unit 60, and the control unit 60 outputs drive signals to the adjustable mask 25 in accordance with the magnitude of the load, and controls the cracking unit volume by controlling the extent to which the two mask plates 25A overlap each other.

Figure 9:
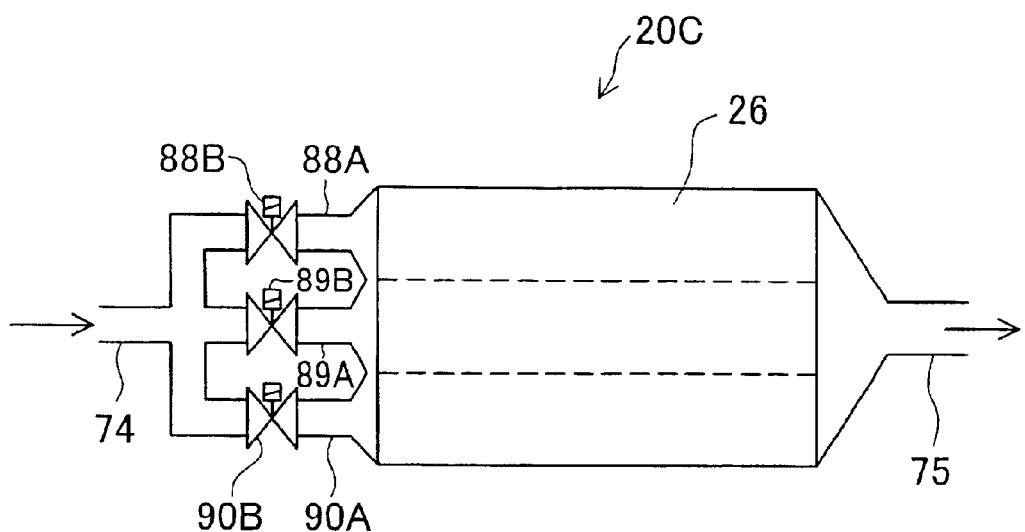
FIG. 9 is a diagram depicting the structure of a cracking unit 20C with a variable cracking unit volume.

FIG. 9 is a diagram schematically depicting the structure of a cracking unit 20C, which is yet another example of a device with a variable cracking unit volume. Whereas the cracking unit 20B is configured to allow the shielded surface area of the inlet portion to be varied, the cracking unit 20C is configured such that the cracking unit volume can be varied by providing separate conduits for introducing gases into the cracking unit. The cracking unit 20C is provided with a reaction chamber 26 composed of a honeycomb tube, and is divided into three gas branch lines 88A, 89A, and 90A between the reaction chamber 26 and the point of connection with the fuel gas conduit 74. The reforming gas branch lines are provided with valves 88B, 89B, and 90B, respectively. These valves are opened and closed in response to drive signals from the control unit 60, and only those honeycomb passages that are connected to open valves can receive a supply of air-containing mixed gas. The control unit 60 outputs a drive signal for each valve in accordance with the magnitude of the load and controls the cracking unit volume by opening the specified valve or valves (specified number of valves).

To obtain a variable system for introducing mixed gases in the manner adopted for the cracking unit 20C in FIG. 9, it is possible to adopt a structure, in place of the separate introduction lines, in which variable-angle gas jet nozzles are provided to the end portion of the fuel gas conduit 74 connected to the cracking unit. In this structure, an air-containing mixed gas is fed by injection at a specified angle through the fuel gas conduit 74 in the direction of the honeycomb tube. In this structure, the jet angle can be varied and the number of honeycomb passages capable of receiving the mixed gas can be controlled (the cracking unit volume can be controlled) instead of the number of opened valves being varied when the mixed gas is sprayed through the nozzle. It is also possible to provide a plurality of nozzles to the end portion of the fuel gas conduit 74 and to control the cracking unit volume by selecting the number of nozzles for spraying the mixed gas into the honeycomb tube in accordance with the load.

Figure 10:
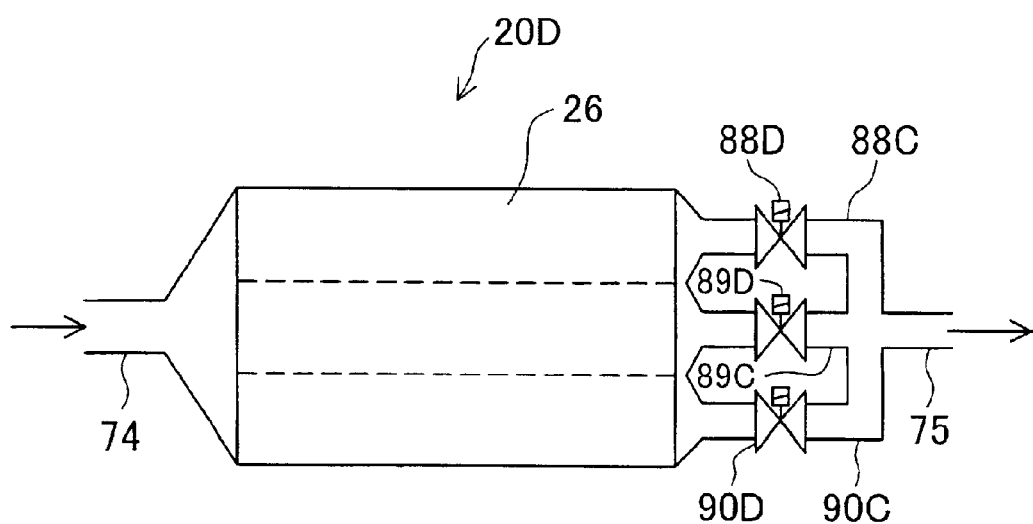
FIG. 10 is a diagram depicting the structure of a cracking unit 20D with a variable cracking unit volume.

FIG. 10 is a diagram schematically depicting the structure of a cracking unit 20D, which is still another example of a device with a variable cracking unit volume. Whereas the cracking unit 20C is configured to allow the cracking unit volume to be varied by splitting the route of the supplied mixed gas, the cracking unit 20D is configured such that the cracking unit volume is varied by splitting the route of the discharged gas from the cracking unit. The cracking unit 20D is provided with the same reaction chamber 26 as that provided to the cracking unit 20C. This arrangement differs from the cracking unit 20C in that no branch lines are provided to the inlet portion of the reaction chamber 26, but the outlet portion is provided with gas branch lines 88C, 89C, and 90C near the point of connection with the fuel gas conduit 75. The gas branch lines are provided with valves 88D, 89D, and 90D, respectively. These valves are opened and closed in response to drive signals from the control unit 60, and only those honeycomb passages that are connected with open valves can pass the mixed gas. The control unit 60 outputs a drive signal for each valve in accordance with the magnitude of the load and controls the cracking unit volume by opening the specified valve or valves (number of valves).

The above cracking units 20A, 20C, and 20D are described with reference to cases in which the interior of each unit could be divided into three parts to allow the cracking unit volume to be controlled in three steps, but it is also possible to divide the interior of each cracking unit into more than three parts. The cracking unit volume should be varied in accordance with the load in order to bring the residence time closer to the desired value.

4. Modifications of Fuel Cell System 10

As describe above, controlling the residence time of the fluids in the cracking unit 20 allows the reactions occurring in the cracking unit to be kept at the desired level even under a varying load, and prevents situations in which the decomposition reaction fails or an unacceptably large amount of soot forms. The residence time can also be controlled in accordance with the load by modifying the connections between units in the fuel cell system 10 of FIG. 1 instead of controlling the pressure inside the cracking unit 20, adjusting the rate at which steam is fed to the cracking unit 20, or modifying the cracking unit volume in the above-described manner.

4-1. Utilization of Cathode Off-Gas

Figure 11:
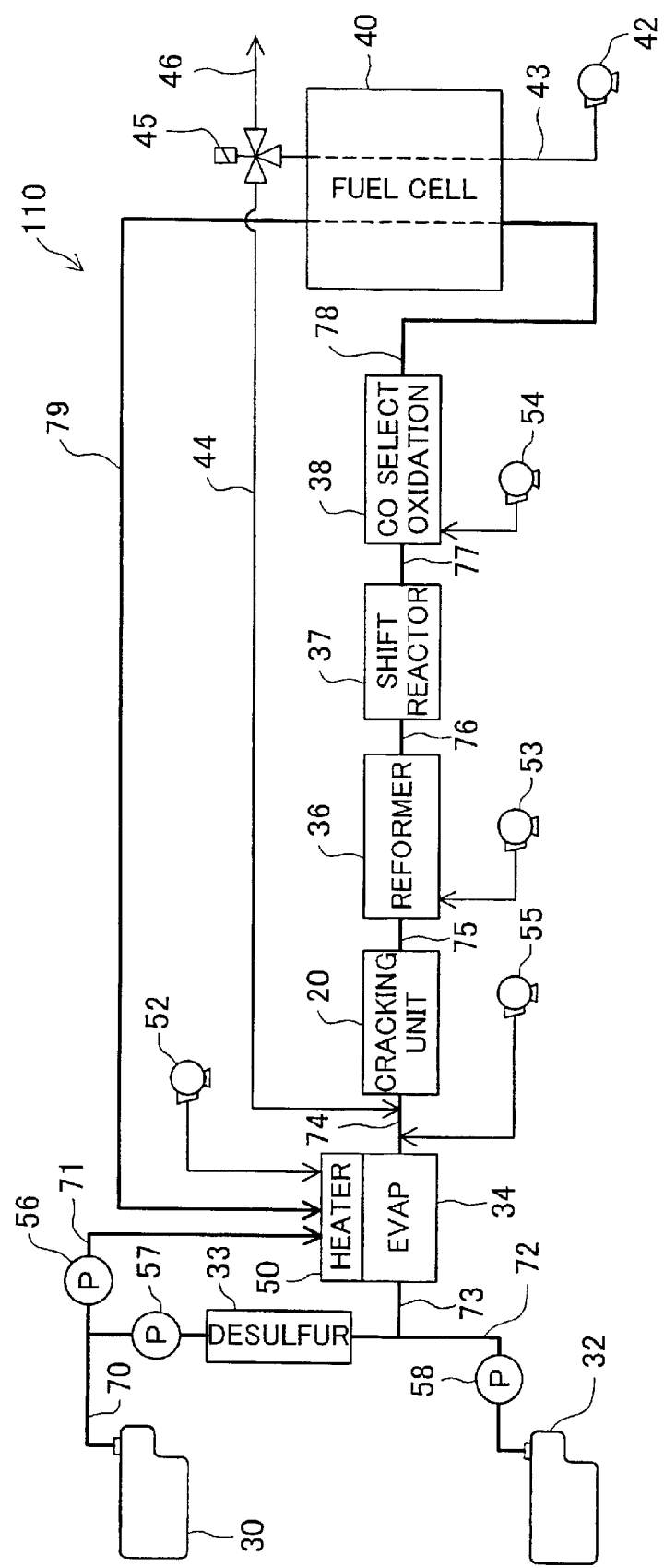
FIG. 11 is a diagram depicting the structure of a fuel cell apparatus 110 as a modification example.
Figure 12:
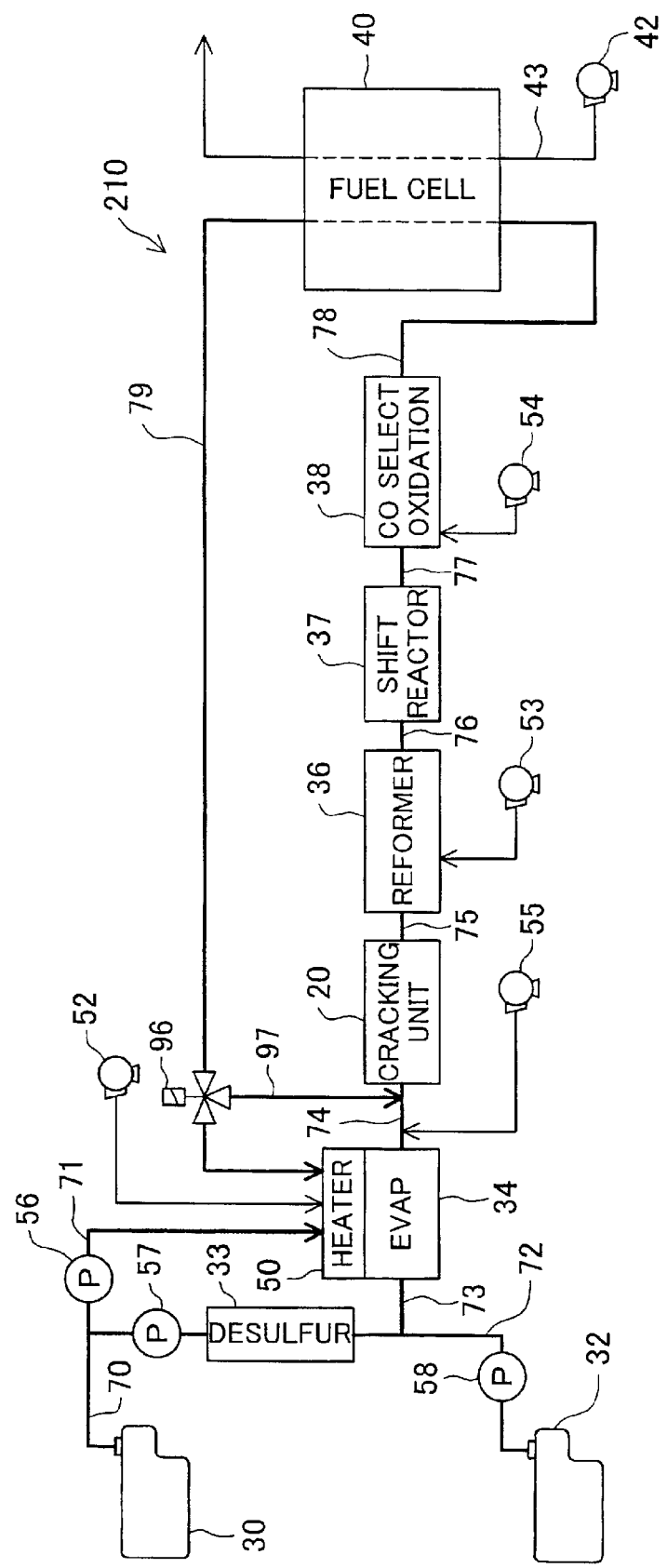
FIG. 12 is a diagram depicting the structure of a fuel cell apparatus 210 as a modification example.
Figure 13:
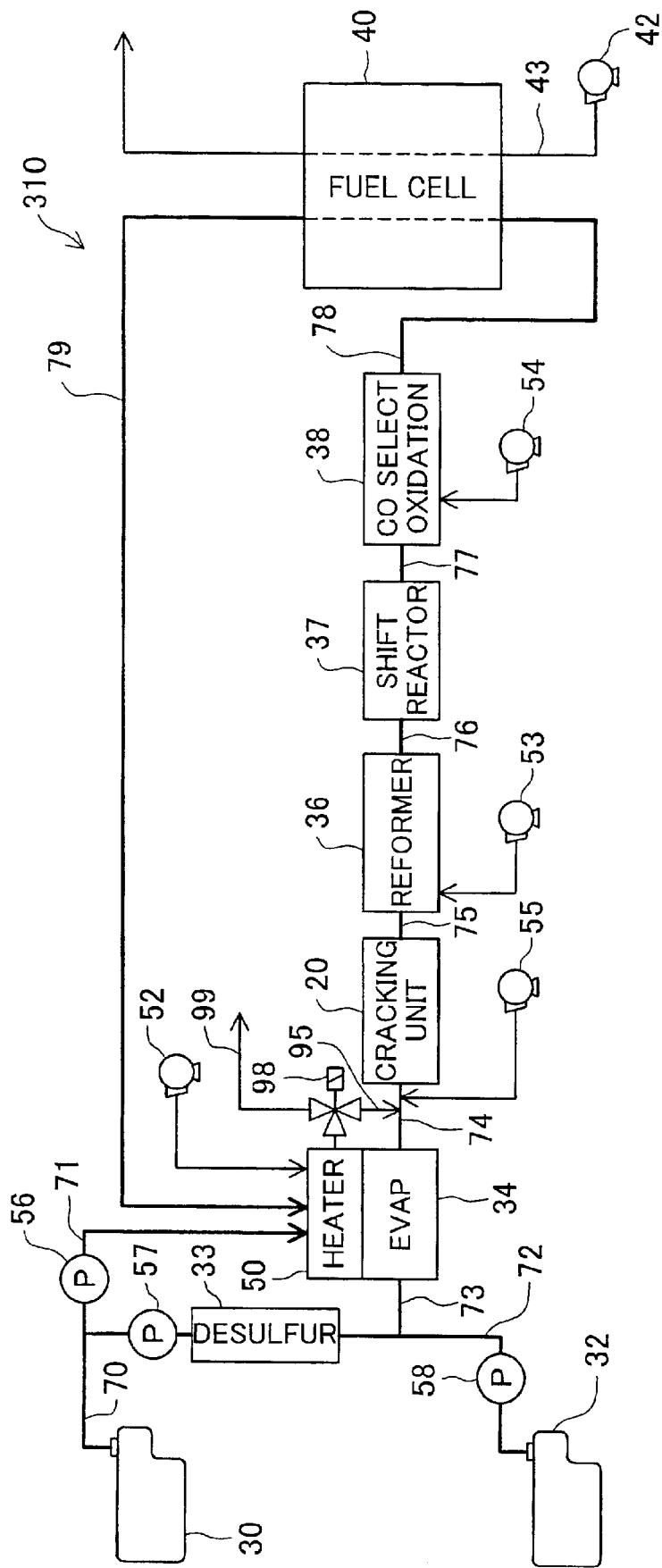
FIG. 13 is a diagram depicting the structure of a fuel cell apparatus 310 as a modification example.

FIG. 11 is a diagram depicting the structure of a fuel cell apparatus 110 as a modification of the fuel cell system 10. The fuel cell apparatus shown in FIG. 11 and in subsequent FIGS. 12 and 13 have substantially the same structure as the fuel cell system 10 in FIG. 1, so similar components will be omitted from the detailed description. Although FIGS. 11 to 13 do not show the control unit 60 depicted in FIG. 1, the fuel cell apparatus shown in FIGS. 11 to 13 are still provided with a control unit 60 for exchanging control signals with other units in the same manner as the fuel cell system 10 shown in FIG. 1. In the fuel cell apparatus 110, a cathode off-gas conduit 44 (which is designed for transmitting a cathode off-gas discharged from the cathode side after being fed to the electrochemical reaction zone in the fuel cell 40) is connected to the fuel gas conduit 74. In other words, the fuel cell system 110 allows cathode off-gas to be fed to the cracking unit 20 together with the mixed gas supplied by the evaporator 34 and the air supplied by the blower 55. The cathode off-gas conduit 44 is also provided with a pass control valve 45 (three port valve), and a branch line 46 branches off from the three port valve 45. The cathode off-gas fed to the branch line 46 via the pass control valve 45 is directly discarded outside. By controlling the pass control valve 45 in this manner, it is possible to control the relative amounts in which the cathode off-gas is fed to the cracking unit 20 and discarded outside.

Cathode off-gas is a gas primarily comprising nitrogen, carbon dioxide, and oxygen. The oxygen concentration of the gas is less than that of air, and a specific concentration is established in accordance with the efficiency of the electrochemical reactions occurring in the fuel cell 40. Non-oxygen components of the cathode off-gas do not directly contribute to the combustion and decomposition reactions occurring in the cracking unit 20. An arrangement is therefore adopted in which at least part of the oxygen supplied to the cracking unit 20 in the fuel cell apparatus 110 shown in FIG. 11 is fed by the cathode off-gas rather than by the air supplied from the blower 55 such that the residence time of the fluids in the cracking unit 20 is controlled by adjusting the flow rate at which the cathode off-gas is fed to the cracking unit 20 and the overall amount in which the gas is fed to the cracking unit 20. Specifically, the residence time can be reduced and excessive soot formation suppressed by increasing the proportion of cathode off-gas used for supplying a specified amount of oxygen to the cracking unit 20 when the load is small. In addition, the residence time can be increased and inadequate pyrolysis prevented from occurring by reducing the proportion of cathode off-gas used for supplying a specified amount of oxygen to the cracking unit 20 when the load is small.

Alternatively, the fuel cell apparatus 110 may be operated such that the flow rate of oxygen to the cracking unit 20 is controlled by adjusting the proportion of the cathode off-gas and air while the residence time of the overall gas maintains the same, that is, while the total amount of cathode off-gas and air fed to the cracking unit 20 maintains the same. The aforementioned O/C value (and reaction rate) can be controlled by adjusting the proportion of the cathode off-gas and air. In addition, cathode off-gas has a temperature below the internal temperature of the cracking unit 20, making it possible to control the internal temperature (and reaction rate) of the cracking unit 20 by controlling the rate at which the cathode off-gas is fed to the cracking unit 20.

4-2. Utilization of Anode Off-Gas

FIG. 12 is a diagram depicting the structure of a fuel cell system 210 as another modification of the fuel cell system 10. In the fuel cell system 210, the anode off-gas conduit 79 for transmitting the anode off-gas discharged from the anode side after being fed to the electrochemical reaction zone in the fuel cell 40 is connected to the branch line 97 of a pass control valve 96 (three port valve) in addition to being connected to the heater 50 in the same manner as with the fuel cell system 10. The branch line 97 is connected to the fuel gas conduit 74 in front of the cracking unit 20. Specifically, the fuel cell system 210 is configured to allow the anode off-gas to be fed to the cracking unit 20 together with the mixed gas supplied by the evaporator 34 and the air supplied by the blower 55. By controlling the pass control valve 96 in this manner, it is possible to control the relative amounts in which the anode off-gas is fed to the cracking unit 20 and the heater 50.

Anode off-gas primarily comprises hydrogen, carbon dioxide, and steam. These components do not directly contribute to the combustion and decomposition reactions occurring in the cracking unit 20. Consequently, the residence time of gas in the cracking unit 20 can be controlled by adjusting the flow rate of the anode off-gas and the overall amount of gas fed to the cracking unit 20. Specifically, the residence time can be reduced and excessive soot formation suppressed by feeding more anode off-gas to the cracking unit 20 when the load decreases. The residence time can be extended and inadequate pyrolysis prevented from occurring by feeding less anode off-gas to the cracking unit 20 when the load increases.

The internal temperature of the cracking unit 20 can be also controlled using the anode off-gas in the fuel cell system 210. Specifically, the temperature of the anode off-gas is less than the internal temperature of the cracking unit 20, so feeding the anode off-gas to the cracking unit 20 reduces the internal temperature of the cracking unit 20. Controlling the flow rate at which the anode off-gas is fed will therefore allow the internal temperature of the cracking unit 20 to be controlled, making it possible to control the reaction rate in the cracking unit 20.

Anode off-gas contains hydrogen, and hydrogen is a high-energy substance believed to attack inter-carbon bonds in the molecules constituting hydrocarbon-based fuels such as gasoline under the high-temperature conditions found inside the cracking unit 20. Hydrogen is therefore expected to promote cracking by causing inter-carbon bonds to break more easily. In addition, the presence of hydrogen in the cracking unit 20 is effective for impeding soot formation. Specifically, reactions in which bonds form between carbon and hydrogen atoms predominate over reactions in which bonds form between carbon atoms at a high ratio of hydrogen (atoms) to carbon atoms in the cracking unit 20. Consequently, reactions in which bonds form between carbon pairs (reactions in which intermediates leading to soot formation are produced) are inhibited by reactions in which bonds form between carbon and hydrogen (reactions in which fresh hydrocarbons are produced), and soot formation is thus suppressed when dehydrogenation proceeds or inter-carbon bonds are broken in gasoline-constituting hydrocarbon molecules.

In view of this, a hydrocarbon obtained by reacting the hydrogen in the cracking unit 20 and the hydrogen in the anode off-gas fed to the cracking unit 20 is supplied to the reforming reaction zone in the reformer 36, yielding a hydrogen product, which is subsequently fed to the fuel cell 40. The hydrogen left over from the production of the hydrocarbon or the like in the cracking unit 20 can be fed to the fuel cell 40 via the reformer 36 and other reactors to be reused for electrochemical reactions. Using anode off-gas to feed hydrogen to the cracking unit 20 in this manner makes it possible to perform pyrolysis in a more efficient manner in the cracking unit 20, to form hydrocarbons by the bonding of carbon and hydrogen instead of allowing soot to form, and to increase the overall efficiency of gasoline reforming operations.

4-3. Utilization of Combustion Exhaust Gas

FIG. 13 is a diagram depicting the structure of a fuel cell apparatus 310 as yet another modification of the fuel cell system 10. In the fuel cell system 310, the combustion exhaust gas discharged from the heater 50 is fed to the cracking unit 20 together with mixed gas and air. As described above, the heater 50 is designed to accept a delivery of anode off-gas or gasoline from the gasoline tank 30, to perform a combustion reaction, and to generate the heat needed for the operation of the evaporator 34. In the fuel cell system described above, the combustion exhaust gas produced by combustion in the heater 50 is discarded outside (not shown). In the fuel cell system 310 shown in FIG. 13, the exhaust gas line 95 for transmitting the combustion exhaust gas discharged from the heater 50 is connected to a fuel gas conduit 74 in front of the cracking unit 20. The exhaust gas line 95 is also connected to a branch line 99 via a pass control valve 98 (three port valve). The combustion exhaust gas discharged into the branch line 99 is directly discarded outside. By controlling the pass control valve 98 with the aid of the control unit 60, it is possible to control the relative amounts in which the combustion exhaust gas is fed to the cracking unit 20 and discarded outside.

Combustion exhaust gas primarily comprises nitrogen, carbon dioxide, and steam. These components do not directly contribute to the combustion and decomposition reactions occurring in the cracking unit 20. Consequently, the residence time of gas in the cracking unit 20 can be controlled by adjusting the flow rate of the combustion exhaust gas and the overall amount of gas fed to the cracking unit 20. Specifically, the residence time can be reduced and excessive soot formation suppressed by feeding more combustion exhaust gas to the cracking unit 20 when the load decreases. The residence time can be extended and inadequate pyrolysis prevented from occurring by feeding less combustion exhaust gas to the cracking unit 20 when the load increases.

The temperature of the combustion exhaust gas is higher than the internal temperature of the cracking unit 20, so feeding the combustion exhaust gas to the cracking unit 20 increases the internal temperature of the cracking unit 20. Consequently, the internal temperature of the cracking unit 20 can be also controlled by controlling the feed rate or feed position of the combustion exhaust gas fed to the cracking unit 20. The high-temperature combustion exhaust gas supply can also be used as the above-described temperature increase promoting means (means for reducing the time needed to achieve an adequate increase in temperature near the inlet portion of the cracking unit 20) by being fed through the inlet portion of the cracking unit 20.

4-4. Utilization of Reaction-Terminating Gas

A control routine based on the use of low-temperature reaction-terminating gas can be employed in addition to controlling the residence time by adjusting the overall amount of gas feed or the volume of the cracking unit 20 as a control routine whereby the reactions occurring in the cracking unit 20 are kept close to the desired state under varying load conditions. Specifically, decomposition in the cracking unit 20 is completed upstream of the outlet portion when the load is low, and adding a reaction-terminating gas whose temperature is less than that of the reforming fuel gas for which reactions have been completed in this manner causes the internal temperature to decrease, making it possible to adequately reduce the activity of reactions otherwise capable of proceeding in the cracking unit 20 after decomposition has been terminated at the desired level, and to inhibit unwanted reactions in their ability to form soot. For example, an effect can be obtained whereby lowering the internal temperature to about 600–700° C. makes it possible to adequately reduce the activity of reactions (such as those leading to soot formation) capable of proceeding inside the cracking unit 20 of the above-described embodiment.

Feeding a reaction-terminating gas has the effect of suppressing soot formation by reducing the residence time in addition to the effect of suppressing soot formation by lowering the temperature. Specifically, adding a reaction-terminating gas increases the gas flow rate downstream of the position where the reaction-terminating gas is added, and makes it easier for the decomposed reforming fuel gas to be discharged from the cracking unit 20. The reforming fuel gas can therefore be discharged from the cracking unit 20 before an inadmissibly large amount of soot is formed by the reactions that proceed after the decomposition reaction has been completed.

Figure 14:
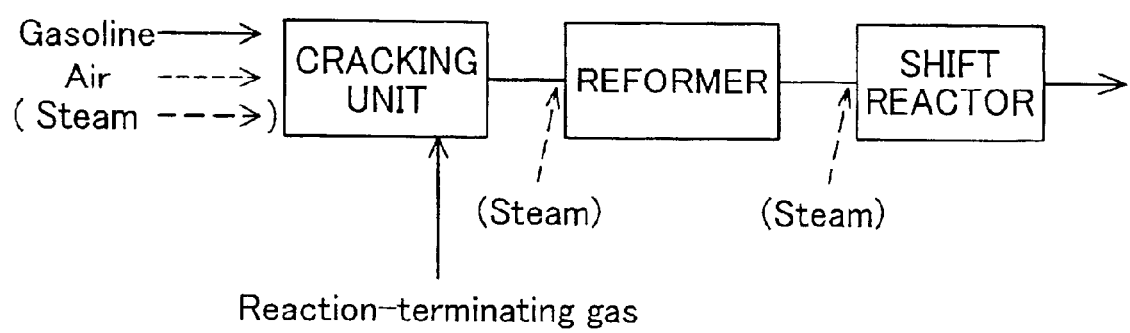
FIG. 14 is a diagram depicting a structure featuring a reaction-terminating gas.

The reaction-terminating gas can be any gas whose temperature is sufficiently low to achieve an adequate reduction in the activity of reactions occurring inside the cracking unit 20 without adversely affecting the reactions occurring in downstream reactors. For example, steam or air can be used. Such a structure is shown in FIG. 14. In FIG. 14, pumps, blowers, piping, and valves used to feed various fluids are omitted for convenience of illustration.

When air is used as the reaction-terminating gas, soot formation can be efficiently controlled by maintaining the desired oxygen concentration in the outlet portion of the cracking unit 20, as described above. It is also possible to terminate the reactions in the cracking unit 20 and to provide the system with the oxygen needed for performing the partial oxidation reaction in the reformer.

When steam is used as the reaction-terminating gas, it is possible to provide the system with the steam needed for performing the steam reforming reaction in the reformer or the shift reaction in the shift reactor. Another feature of using steam as the reaction-terminating gas is that there is no need to adequately preheat the steam in order to markedly increase the activity of the combustion or decomposition reaction in the same manner as when steam is fed through the inlet portion of the cracking unit 20, and that materials can be fed to the cracking unit 20 at a lower temperature, making it possible to reduce the amount of energy needed for steam heating.

In addition, the fuel cell system is configured such that the internal temperature of the reformer 36 must remain well below the temperature of the cracking unit 20 for some types of the catalysts provided to the reformer 36, and this sometimes requires providing a structure in which the reforming fuel gas supplied from the cracking unit 20 is cooled before being fed to the reformer 36. In such cases, the presence of a reaction-terminating gas supply allows the temperature of the reforming fuel gas to be reduced by the addition of the reaction-terminating gas, making it possible to simplify or completely eliminate the dedicated device for cooling the reforming fuel gas.

A structure in which water is sprayed directly into the cracking unit 20 with a spray nozzle can be adopted instead of the structure in which steam is vaporized in advance as the reaction-terminating gas. Adopting this structure causes reactions to proceed much less actively in the cracking unit 20 because the water sprayed inside the cracking unit 20 is immediately vaporized by the heat contained in the cracking unit 20, and the temperature inside the cracking unit 20 is reduced during such vaporization. This arrangement also makes it possible to reduce the amount of energy needed to vaporize water before feeding it to the cracking unit 20.

The reaction-terminating gas may also be fed at a plurality of locations in the direction of gas flow inside the cracking unit 20 in order to achieve adequate efficiency when trying to prevent excessive soot from being formed by unwanted reactions, which are that continue to occur in the cracking unit 20 even after adequate decomposition has been achieved. Controlling the rate at which the reaction-terminating gas is fed (or the position at which it is fed) in accordance with the magnitude of the load makes it possible to decompose gasoline in an optimal manner and to obtain a reforming fuel gas while minimizing soot formation.

5. Indirect Heating of Cracking Unit 20

In the above embodiment, the heat needed for performing pyrolysis in the cracking unit 20 can be directly supplied to the pyrolysis reaction zone by the combustion reaction (internal heat source) carried out in the cracking unit 20 or by the combustion exhaust gas or other high-temperature fluid introduced into the cracking unit 20. In other words, heat is directly transferred with heat medium introduced into a zone where a hydrocarbon-based fuel is pyrolyzed. According to an alternative arrangement, the cracking unit is provided with a heat exchanger to allow heat to be transmitted indirectly by being exchanged through this heat exchanger between a specified high-temperature fluid and the gas fed to the decomposition reaction zone of the cracking unit 20.

Figure 15A:
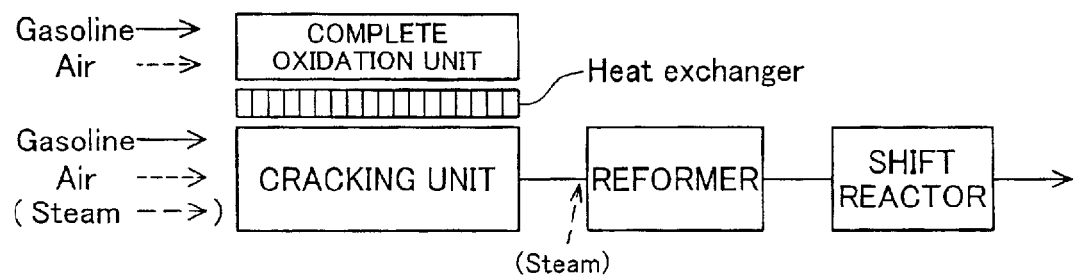
FIGS. 15(A)–15(D) illustrate various configurations for the heat transfer via a heat exchanger to a cracking unit.

FIGS. 15(A)–15(D) illustrate various configurations for the heat transfer via a heat exchanger to the cracking unit. In FIGS. 15(A)–15(D), pumps, blowers, piping, and valves used to feed various fluids are omitted for convenience of illustration. In FIG. 15(A), a complete oxidation unit designed to achieve complete gasoline oxidation is provided. The gases passing through the cracking unit 20 exchange heat via a heat exchanger with the high-temperature combustion gas produced by complete oxidation in the complete oxidation unit.

Figure 15B:
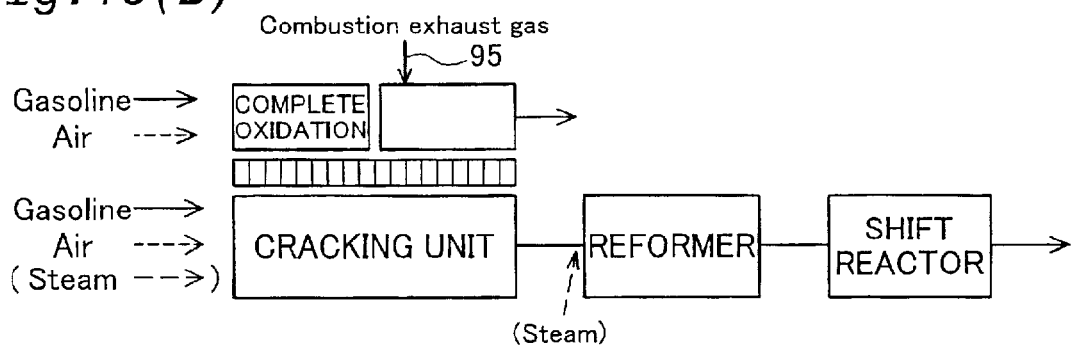

A fluid other than the high-temperature combustion gas produced by complete oxidation can also be used as the high-temperature fluid for supplying the heat needed to perform decomposition reactions via a heat exchanger. It is possible, for example, to use a combustion exhaust gas discharged from the heater 50 for the evaporator 34. Such a structure is shown in FIG. 15(B). In this case, the high-temperature fluids include the combustion exhaust gas passing through an exhaust gas line 95, which is equipped with the fuel cell system 310 shown in FIG. 13. The structure shown in FIG. 15(B) is described with reference to a case in which heat is exchanged with a high-temperature combustion gas (produced by a higher-temperature temperature complete oxidation reaction) near the inlet portion of the cracking unit 20 in order to heat the inlet portion of the cracking unit 20 more rapidly, but it is also possible to use solely the combustion exhaust gas discharged from the heater 50.

Figure 15C:
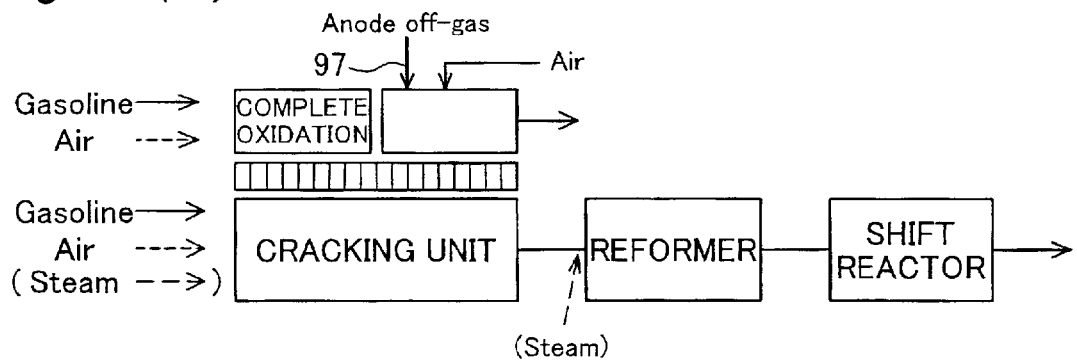

The anode off-gas discharged from the fuel cell 40 may also be used. Such a structure is shown in FIG. 15(C). The anode off-gas discharged from the fuel cell 40 is typically heated to a specified temperature selected in accordance with the operating temperature of the fuel cell 40. In the case under consideration, air (oxygen) is further added to the anode off-gas (shown in FIG. 15(C) as the anode off-gas passing through a branch line 97 provided with the fuel cell system 210 of FIG. 12), the hydrogen remaining in the anode off-gas is combusted, and the heated anode off-gas is used as one of the high-temperature fluids. The structure in FIG. 15(C) is similar to the structure in FIG. 15(B) in that it is provided with a complete oxidation unit, and a higher-temperature combustion gas is used to speed up heating in the inlet portion of the cracking unit 20.

Figure 15D:
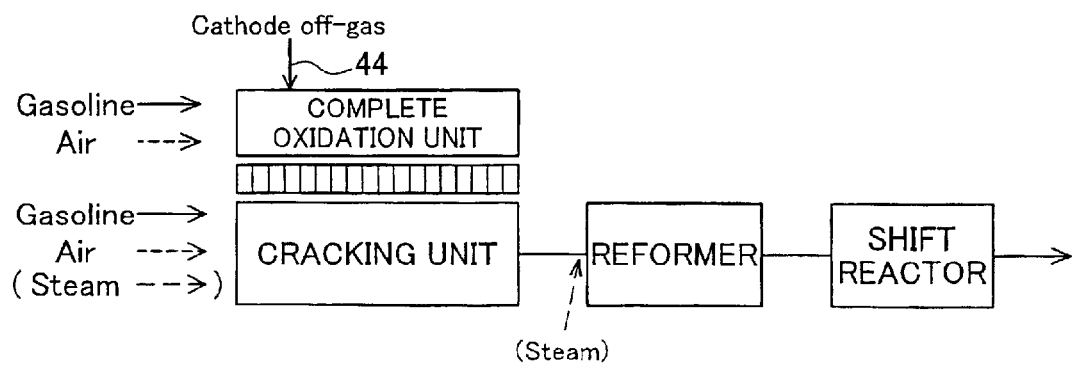

Alternatively, the cathode off-gas discharged from the fuel cell 40 can be used. Such a structure is shown in FIG. 15(D). The cathode off-gas discharged from the fuel cell 40 is typically heated to a specified temperature selected in accordance with the operating temperature of the fuel cell 40. In the case under consideration, cathode off-gas (shown in FIG. 15(D) as the cathode off-gas passing through a cathode off-gas conduit 44 provided with the fuel cell system 110 of FIG. 11) is fed to the complete oxidation unit, making it possible to utilize the heat of the cathode off-gas and to use the oxygen in the cathode off-gas to perform complete oxidation in the complete oxidation unit when this unit is used to heat the gas in the cracking unit 20 via the heat exchanger.

The anode or cathode off-gas discharged from the fuel cell 40 can be directly used as a high-temperature fluid of the heat exchanger when the fuel cell 40 has a sufficiently high operating temperature. Specifically, the anode or cathode off-gas can be used as a high-temperature fluid without being fed to the combustion reaction zone in the above-described manner when this gas has sufficiently high temperature.

The amount of the combustion reactions proceeding together with he decomposition reactions in the cracking unit 20 can be reduced when the heat needed for decomposing a hydrocarbon-based fuel is supplied via a heat exchanger in the above-described manner. The rate at which oxygen is fed to the cracking unit 20 in order to be supplied to the combustion reaction zone can therefore be lowered, the amount of carbon monoxide produced by combustion can be reduced in the reforming fuel gas discharged from the cracking unit 20, and the hydrogen concentration of the hydrogen-rich gas obtained by reforming can be further increased.

When an adequate quantity of heat is supplied to the cracking unit 20 via a heat exchanger, the cracking unit 20 can be operated such that the hydrocarbon-based fuel is merely decomposed instead of undergoing both complete oxidation and decomposition. In such cases, the rate at which air is fed to the cracking unit 20 should be reduced to prevent combustion reactions from occurring in the cracking unit 20. This approach dispenses with the need to oxidize the reforming gas before supplying it to the reforming gas zone, and is therefore effective for reducing the amount of carbon dioxide produced during oxidation and for raising the hydrogen concentration of the hydrogen-rich gas produced by reforming (or the partial pressure of hydrogen in the combustion gas fed to the fuel cell 40).

Although individual structures pertaining to controlling the residence time or reaction rate in the cracking unit 20 have been described above as a means of facilitating decomposition reactions while suppressing soot formation in the cracking unit under a varying load, it is also possible to concurrently employ a plurality of these structures when they are adapted to actual fuel cell system. Controlling the process by employing a plurality of means provides faster response to load variations and increases the energy efficiency of the entire fuel cell system 10. Reactions can be kept in the desired state with higher precision by adopting an approach in which the O/C value is controlled based on the load, the internal temperature of the cracking unit or the concentration of oxygen inside the cracking unit is sensed, and the inlet gas temperature is controlled on the basis of the sensed values.

Although the above embodiment is described with reference to structures in which gasoline is used as the hydrocarbon-based fuel, it is also possible to use naphtha, light oil, or another non-gasoline hydrocarbon-based fuel. When hydrogen-rich gas is produced using a higher hydrocarbon-based fuel with a carbon number of 4 or greater in this manner, the same effects can be successfully obtained in terms of suppressing soot formation during reforming or improving reforming efficiency by decomposing the higher hydrocarbon-based fuel such that the carbon number is reduced prior to reforming.

The above embodiment is described with the assumption that the rate at which hydrocarbon-based fuel is fed to the cracking unit is established at the level necessary for producing the hydrogen needed for obtaining the desired electric power in accordance with the magnitude of the load. Even when the rate of hydrocarbon-based fuel is established in this manner, there is still a risk that the rate at which hydrogen is ultimately fed to the fuel cell 40 will fail to match the magnitude of the load in a structure in which the units constituting the fuel cell system are not sufficiently responsive to the load. An excess of hydrogen will reduce the generating efficiency of the fuel cell 40 and will result in the wasteful use of resources, while a deficit of hydrogen will make it impossible for the fuel cell 40 to generate electric power at the rate necessary to meet load requirements. In equipment in which the above-described fuel cell system is used as a power supply, such undesirable phenomena can be prevented by supplementing the fuel cell 40 with a secondary cell capable of supplying insufficient power in accordance with the load. Specifically, the secondary cell should be charged with excess power when the fuel cell 40 receives hydrogen at a rate that allows excess power to be generated in relation to the load. When the hydrogen supplied to the fuel cell 40 is insufficient for generating power in accordance with the load, the power deficiency should be compensated for by the secondary cell. Even when the units constituting the fuel cell system have better responsiveness with respect to the load, providing the above-described fuel cell system with a secondary cell makes it possible to adjust the rate at which gasoline is fed to the cracking unit 20 such that the residence time of the fluids in the cracking unit 20 is kept closer to the desired level. Specifically, variations occurring in the gasoline feed rate under a varying load can be kept lower in a controlled manner, variations in the residence time of fluids in the cracking unit 20 under the varying load can be more successfully prevented from reaching unacceptable proportions, and any excess or deficiency of power generated by the fuel cell 40 (and based on the rate at which hydrogen is fed) can be compensated for by a secondary cell.

Placing a cracking unit upstream of the reformer 36 in the above-described manner has the effect of decomposing a higher hydrocarbon-based fuel with a high carbon number, such as gasoline, to a hydrocarbon-based fuel with a lower carbon number, suppressing soot formation in the reformer 36, and increasing the efficiency of reforming reactions. In this case, adopting an arrangement in which the reaction temperature of the cracking unit is sufficiently higher than the reaction temperature of the reformer 36 (in the above embodiment, the temperatures are about 800–1000° C. for the cracking unit 20, and about 600° C. for the reformer 36) makes it possible to provide at least part of the heat needed for conducting steam reforming reactions in the reformer 36 in the form of heat supplied to the reformer 36 by the reforming fuel gas discharged from the cracking unit.

There is some possibility that the temperature inside the reformer will become unacceptably high if a substantial difference exists between the temperature inside the cracking unit and the reaction temperature in the reformer 36. In such cases, water may be sprayed at an upstream part of the reformer 36 in order to reduce the temperature to a level suitable for the reforming reaction zone. In the particular case in which water required for steam reforming reactions is supplementally added to the reformer in the manner shown in FIG. 2(C), the energy needed for vaporizing the supplemental water can be reduced by a method in which at least part of the supplemental water is sprayed inside the reformer in order to cool the reforming fuel gas. The energy efficiency of the entire apparatus can thus be enhanced.

The structure of the cracking unit for decomposing gasoline or another hydrocarbon-based fuel is not limited to those described with reference to the above embodiment. In one of the structures described with reference to the above example, a hydrocarbon-based fuel is pyrolyzed, and the heat needed for the pyrolysis is obtained by the partial combustion of the hydrocarbon-based fuel. In another structure, the aforementioned pyrolysis is performed using heat generated in a specifiec high-temperature unit of the fuel reforming apparatus in the fuel cell system. In yet another structure, pyrolysis is facilitated by the use of a low-temperature plasma. Different structures can thus yield the same effect as long as a hydrocarbon-based fuel with a high carbon number is decomposed to a hydrocarbon-based fuel with a sufficiently low carbon number prior to reforming.

6. Reformer with Inhibited Gas-phase Reactions

In the above embodiment, soot formation is reduced, efficient reforming reactions are carried out, and problems commonly encountered during the reforming of a higher hydrocarbon-based fuel such as gasoline are overcome by decomposing the fuel before it is reformed. As described above, a higher hydrocarbon-based fuel is reformed at a higher temperature than a fuel such as methanol, and this high temperature activates side reactions that yield carbon monoxide, methane, and other undesirable components. In the second embodiment shown below, a description is given of a structure for suppressing unwanted reactions such as those occurring during reforming.

Figure 16:
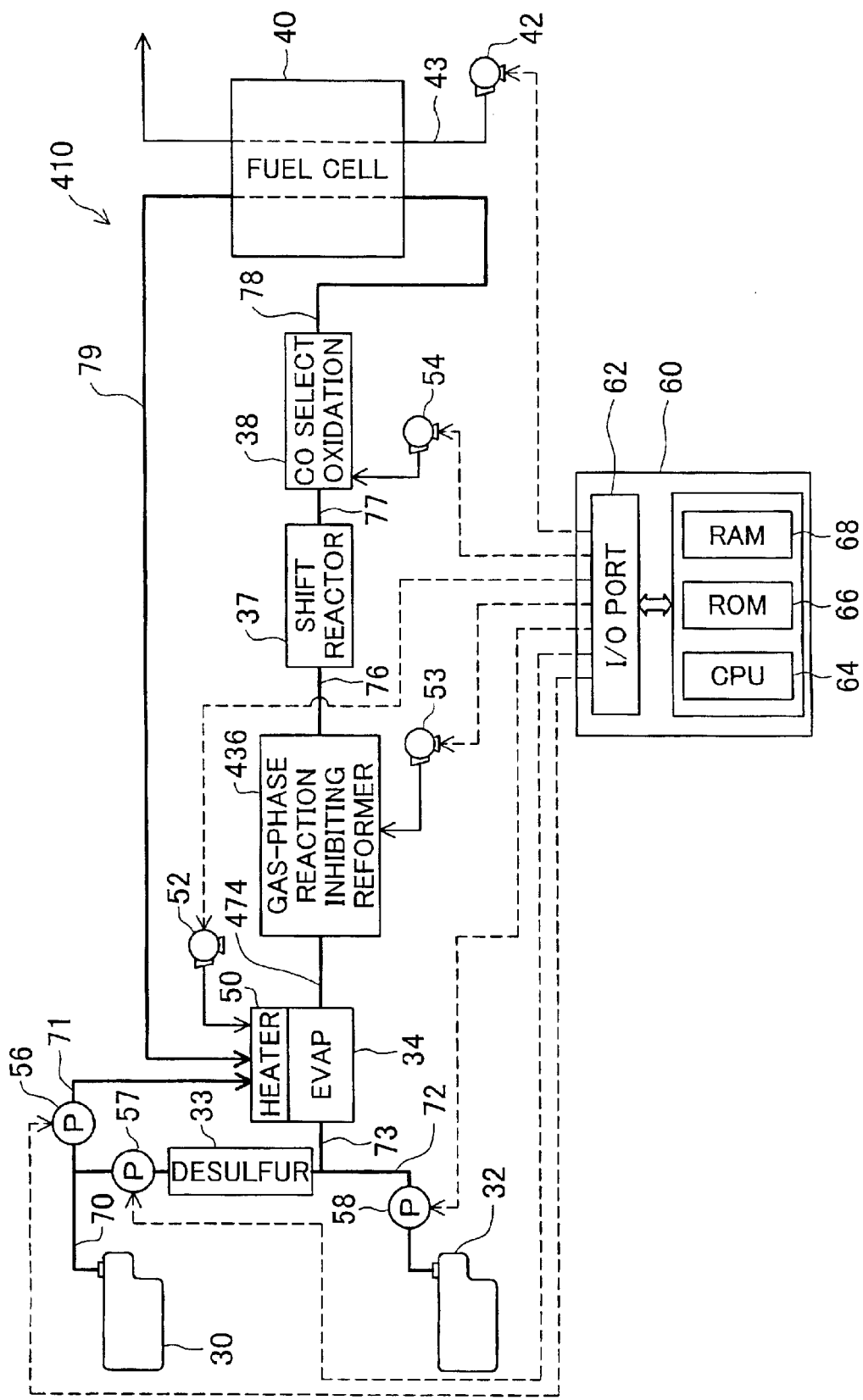
FIG. 16 is a diagram depicting the structure of a fuel cell apparatus 410.

FIG. 16 is a diagram depicting the structure of the fuel cell system 410 pertaining to the second embodiment. Hydrogen-producing reactions in the reformer (steam reforming and partial oxidation reactions) occur as a result of a process in which steam, molecules constituting a hydrocarbon-based fuel, and optional oxygen are reacted over the catalyst inside the reformer. By contrast, reactions that yield carbon monoxide or methane primarily occur in the gas phase off the catalyst inside the reformer. The fuel cell system 410 of the second embodiment is provided with a gas-phase reaction inhibiting reformer 436 in which such gas-phase reactions are inhibited. In the gas-phase reaction inhibiting reformer 436, a supply of mixed gas comprising steam and gasoline vapor is received from the evaporator 34 via a fuel gas conduit 474, a reforming reaction is carried out, and the hydrogen-rich gas produced by the reforming reaction is fed to a shift reactor 37 via a gas conduit 76. In the fuel cell system 410, the elements other than the gas-phase reaction inhibiting reformer 436 are the same as those in the fuel cell system 10 shown in FIG. 1, and are therefore omitted from the detailed description.

A boundary layer of flow forms on the inner wall surface of the reformer (that is, on the reforming catalyst) when mixed gas is passing through the reformer while undergoing a reforming reaction. The mixed gas flows slowly in the boundary layer, and the reagents supplied to the reforming reaction zone and the products generated by these reforming reaction are present in the layer in large amounts. In the gas-phase reaction inhibiting reformer 436 of the present embodiment, mass diffusion on the reforming catalyst is facilitated by reducing the thickness of the boundary layer on the reforming catalyst. A more active mass diffusion facilitates exchange between products generated by the reforming reaction and reagents supplied to the reforming reaction zone, causing the reforming reaction occurring on the catalyst to proceed more actively.

The reforming reactions occurring on the catalyst proceed more rapidly than the gas-phase reactions in the reformer which produce carbon monoxide and methane. Consequently, making the boundary layer thinner to promote mass diffusion and to activate the reforming reactions on the catalyst allows the reforming reactions to proceed more rapidly and to reach the desired level before the unwanted reactions occurring in the gas phase reach unacceptable proportions. The gas-phase reaction inhibiting reformer 436 of the present embodiment can be configured such that the residence time of the fluids in the gas-phase reaction inhibiting reformer 436 can be reduced (space rate increased) by selecting a desired structure for the reformer or controlling the flow rate of the mixed gas, thus allowing the hydrogen-rich gas produced by reforming to be discharged outside before the unwanted reactions occurring in the gas phase reach unacceptable proportions.

Specific examples of methods for reducing the thickness of the boundary layer in the gas-phase reaction inhibiting reformer 436 include adopting a honeycomb tube or a porous article for the interior of the gas-phase reaction inhibiting reformer 436 and using smaller cells of the honeycomb tube or porous article when a reforming catalyst is supported on the cell surfaces. Using a honeycomb tube or a porous article with smaller cells reduces the cross-sectional area of each passage in the reformer and reduces a ratio of the volume of the space for passing the gas to the reforming reaction zone to the total surface area of the catalyst, resulting in a thinner boundary layer. The effect of reducing the thickness of the boundary layer can be enhanced by reducing a L/D value, where L is the total length of passages in the entire reformer, and D is the cross-sectional diameter of the entire reformer. Configuring the gas-phase reaction inhibiting reformer 436 such that the L/D value is reduced in the above-described manner makes it possible to reduce the residence time by reducing the distance between the region of increased activity for partial oxidation (exothermic reaction) and the region of increased activity for steam reforming (endothermic reaction) in the gas-phase reaction inhibiting reformer 436 to provide for more-efficient reforming reactions.

The extent to which gas-phase reactions can be prevented from occurring with a thinner boundary layer and a shorter residence time (higher space rate) in this manner can be determined by analyzing the components of the hydrogen-rich gas discharged from the reformer. When the aforementioned gas-phase reactions are in equilibrium, and the reaction tank (reformer) fashioned to a specified capacity is kept at a specified temperature, the rate at which carbon monoxide or methane is produced by the equilibrium reactions can be determined based on the equilibrium theory. The extent to which gas-phase reactions are suppressed can therefore be determined by comparing a value based on the equilibrium theory and actual concentrations of carbon monoxide and methane in the gas discharged from the gas-phase reaction inhibiting reformer 436. Configuration parameters such as cell dimensions of a honeycomb or a porous article, L/D value, or operating conditions such as residence time (space rate) should therefore be selected in advance in order to keep the gas-phase reactions in the gas-phase reaction inhibiting reformer 436 at a sufficiently low level. The residence time of the fluids in the gas-phase reaction inhibiting reformer 436 can be controlled by any of the methods (for example, by controlling the feed rate of steam, the feed rate of air, or the pressure) adopted for controlling the residence time of the fluids in the cracking unit 20. It is also possible to adopt an arrangement that makes it easier for hydrogen-rich gas to be discharged from the reformer before the reactions that produce unwanted components can reach an unacceptable level. This can be achieved not only by controlling the overall residence time of the fluids in the gas-phase reaction inhibiting reformer 436 but also by feeding a reaction-terminating gas (including sprayed water) on the downstream side in the same manner as that adopted for the above-described cracking unit 20.

It is also possible to use an ordinary reformer whose operating conditions are established based on the efficiency of a reforming reaction in addition to the gas-phase reaction inhibiting reformer 436. This structure has the advantages that the gas-phase reactions are suppressed by employing the gas-phase reaction inhibiting reformer 436 and that the additional reformer can be of a compact size. The overall structure (characterized, for example, by the balance between the size of the gas-phase reaction inhibiting reformer and the size of the ordinary reformer) of the apparatus should be appropriately determined with consideration for the efficiency of reforming reactions, the effect obtained by suppressing gas-phase reactions, and other factors related to the ultimately obtained hydrogen-rich gas.

The fuel cell system provided with the gas-phase reaction inhibiting reformer 436 may also be provided with the mixing unit 35 in the fuel cell system 10A shown in FIG. 4. Specifically, it is possible to adopt an arrangement in which the mixing unit is placed in front of the gas-phase reaction inhibiting reformer 436, and pre-vaporized gasoline and steam (air is yet another option) are mixed in the mixing unit before being fed to the gas-phase reaction inhibiting reformer 436. With this arrangement, vaporized gasoline and steam are mixed, making it possible to supply a more uniform mixed gas to the reforming reaction zone.

7. Fuel Cells with Direct Fuel Supply
7-1. Structure of Fuel Cell System 510

Although the above embodiments are described with reference to a case involving a solid polymer fuel cell, the same effect can be obtained with other types of fuel cells. Some fuel cells are configured such that a hydrocarbon-based fuel is fed directly to the fuel cell. A fuel cell characterized by direct fuel supply still allows soot formation to be inhibited and other effects obtained if a cracking unit is provided and the hydrocarbon-based fuel is decomposed before being fed to the fuel cell. A fuel cell system comprising a cracking unit in addition to a fuel cell characterized by direct fuel supply is described below as a third embodiment.

Figure 17:
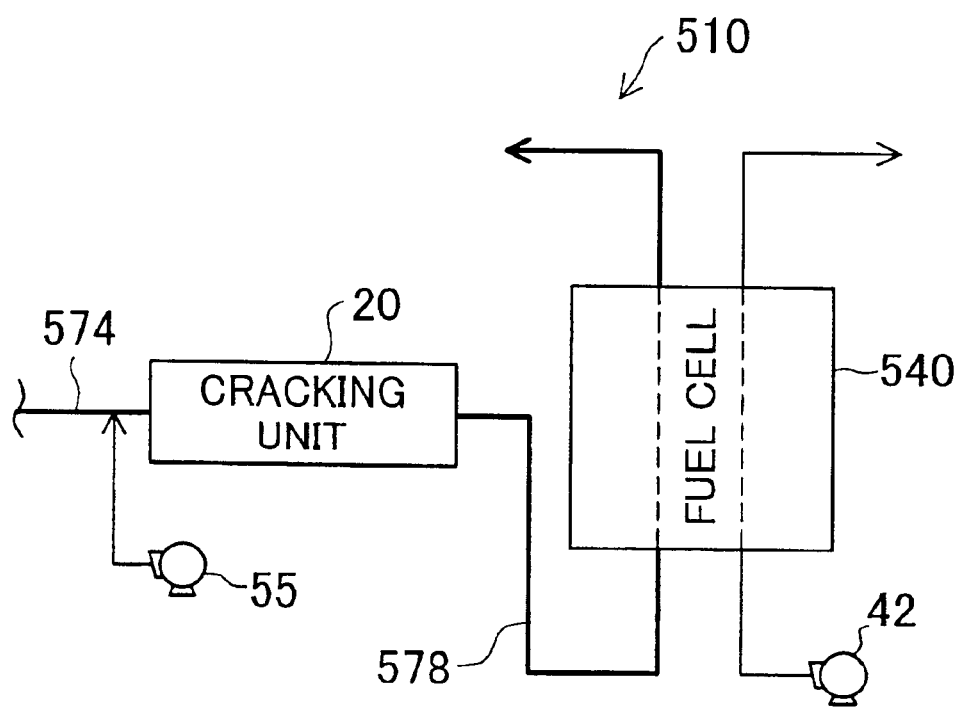
FIG. 17 is a diagram depicting the structure used to supply a hydrocarbon-based fuel directly to a fuel cell.

FIG. 17 is a diagram depicting part of the structure of a fuel cell system 510 pertaining to the third embodiment. In this system, a heated mixed gas containing a higher hydrocarbon-based fuel is fed to the cracking unit 20 through a fuel gas conduit 574 identical to the fuel gas conduit 74 of the above-described embodiments. The cracking unit 20 has the same structure as that described with reference to the above embodiments. The hydrocarbon-based fuel decomposed in the cracking unit 20 to a state with a lower carbon number is fed via a fuel gas conduit 578 to a fuel cell 540, which is a fuel cell characterized by direct fuel supply.

A solid oxide electrolyte fuel cell in which oxide ions are moving across the electrolyte can be cited as an example of the fuel cell 540 characterized by direct fuel supply. The fuel can be directly supplied to the fuel cell of a high-temperature type, and such high-temperature fuel cells include a molten carbonate fuel cell and a solid electrolyte fuel cell in which protons serves as the transporting ion species.

The fuel cell 540 of the present embodiment is provided with an internally disposed reforming catalyst. The hydrocarbon-based fuel decomposed in the cracking unit 20 is supplied to a reforming reaction zone on the reforming catalyst in the fuel cell 540 to generate hydrogen, and this hydrogen is supplied to the electrochemical reaction zone at the anode. In a structure in which reforming occurs inside the fuel cell in this manner, the production of heat that accompanies power generation can be used for reforming, the heat produced during power generation can be efficiently utilized, the amount of energy consumed in order to supply the heat needed for reforming can be reduced, and the energy can be used more efficiently in the fuel cell system.

In the fuel cell system 510 pertaining to the third embodiment thus configured, the undesirable formation of soot in the fuel cell 540 can be suppressed because the hydrocarbon-based fuel is decomposed in the cracking unit 20 before being fed to the fuel cell 540. Because higher hydrocarbons (including aromatic hydrocarbons) have high adsorptivity, directly feeding a higher hydrocarbon-based fuel to a fuel cell causes this hydrocarbon-based fuel to accumulate in unacceptably high concentrations on the surfaces of metals and metal oxides constituting the fuel cell. Consequently, soot-forming reactions become more active than the desired oxide reactions (electrode reactions) on a catalyst (or electrolyte) composed of such metals or metal oxides, catalyst surfaces become covered with soot, and the desired electrode reactions promoted by the catalyst lose some of their activity. The fuel cell with an internally disposed reforming catalyst may have a problem that the surfaces of the reforming catalyst will be covered with soot, and the activity of the reforming reaction will decline. Soot formation can be minimized and adequate cell performance maintained by providing the system with a cracking unit 20 and decomposing the hydrocarbon-based fuel into a hydrocarbon-based fuel with a lower carbon number before feeding this fuel to the fuel cell, as described with reference to the present embodiment. Decomposing the hydrocarbon-based fuel to a lower carbon number has the additional effect of enhancing the efficiency of the reforming reactions (steam reforming reaction and/or partial oxidation reaction) performed using this hydrocarbon-based fuel in the fuel cell, and allows the fuel cell to generate power with greater efficiency.

Although the mixed gas supplied from the fuel gas conduit 574 may already contain steam in the same manner as in the above embodiments, it is also possible to add steam after the hydrocarbon-based fuel has been decomposed in the cracking unit 20, and to feed the resulting product to the fuel cell 540. Maintaining an adequate amount of steam in this manner allows the steam needed for the steam reforming reaction occurring in the fuel cell 540 to be supplied in a sufficient amount, and soot to be prevented from forming in the fuel cell 540.

Alternatively, the hydrocarbon-based fuel can be reformed solely by partial oxidation without undergoing steam reforming in the fuel cell 540. In another structure, the hydrocarbon-based fuel decomposed in the cracking unit 20 may be directly used in the electrochemical reaction zone in the manner described below. Adopting this structure makes it possible to operate a fuel cell system without feeding steam to the fuel cell. This approach also dispenses with the need for a device for recovering excess water in the fuel cell system, making it possible to simplify the entire system and to eliminate problems encountered when water freezes inside the fuel cell system at low temperatures.

7-2. Operation of Fuel Cell System 510 During Startup

Providing a cracking unit 20 upstream of a fuel cell of a direct fuel supply type allows the startup time (warming time) of the fuel cell system 510 to be reduced by oxidizing and decomposing the hydrocarbon-based fuel in the cracking unit. Following is a description of the manner in which the fuel cell system 510 operates during startup.

The units of the fuel cell need to be rapidly brought to the desired operating temperature in order to allow the fuel cell to be able to generate power in a steady state when the fuel cell system is started. When the fuel cell system 510 of the present embodiment is started, the warming time can be reduced by adopting an approach in which the rate at which oxygen is fed to the cracking unit 20 together with a hydrocarbon-based fuel is higher than during regular power generation. In other words, the type of reaction occurring inside can be controlled by varying the rate at which oxygen is fed together with the hydrocarbon-based fuel to the cracking unit 20. When the feed rate of oxygen remains within a specified range, the hydrocarbon-based fuel can be partially oxidized in the cracking unit 20, and the hydrocarbon-based fuel can be decomposed using the heat generated by such partial oxidation, as described above. In this case, increasing the rate at which oxygen is fed results in a more active partial oxidation reaction. According to the control routine adopted for the present embodiment, oxygen is fed to the cracking unit 20 at a sufficiently high rate during the startup of the fuel cell system 510, the partial oxidation reaction is rendered more active, and most of the hydrocarbon-based fuel is converted to hydrogen and carbon monoxide by the partial oxidation reaction.

As described above, the rate at which oxygen is fed to the cracking unit 20 together with a hydrocarbon-based fuel can be controlled by means of an O/C value, which is the ratio of the mole number of oxygen atoms in the gas to the mole number of the carbon atoms in the gas being fed to the cracking unit. In the present embodiment, partial oxidation is activated and the hydrocarbon-based fuel is efficiently used to produce hydrogen and carbon monoxide by keeping the O/C value at about 1 in controlled fashion during the startup of the fuel cell system 510. The cracking unit 20 can thus be rapidly heated by the increased oxygen feed rate, performing partial oxidation more actively than in a steady state, and allowing the hydrocarbon-based fuel to undergo minimal decomposition (endothermic reaction). In addition, heating the cracking unit 20 increases the temperature of the gas fed to the fuel cell 540 from the cracking unit 20, allowing the fuel cell 540 to be warmed up more rapidly.

Another feature of the present embodiment is that the hydrogen and carbon monoxide produced by the hydrocarbon-based fuel in the cracking unit 20 are further oxidized in the fuel cell 540, and the fuel cell 540 is heated by the heat generated by this oxidation reaction. Specifically, feeding hydrogen and carbon monoxide together with oxygen to the fuel cell 540 causes an oxidation reaction involving hydrogen and carbon monoxide to occur over the catalyst on the anode side and allows the fuel cell 540 to be warmed up more rapidly by the generation of heat inside the fuel cell 540.

Increasing the rate at which oxygen is fed to the cracking unit 20 in this manner intensifies partial oxidation in the cracking unit 20, stabilizes the oxidation reaction maintained in the fuel cell 540 by means of externally supplied oxygen, allows the cracking unit 20 and fuel cell 540 to be warmed more rapidly, and reduces the warming time. Although the hydrocarbon-based fuel used herein can be oxidized in the presence of oxygen over the catalyst provided to the fuel cell 540, hydrogen and carbon monoxide have a much higher oxidation reactivity than does a hydrocarbon-based fuel. Consequently, the fuel cell 540 can be heated more efficiently by oxidation performed using hydrogen and carbon monoxide which are produced from a hydrocarbon-based fuel as a result of a partial oxidation reaction in the manner described with reference to the present embodiment.

In the fuel cell system 510 of the present embodiment, the cracking unit 20 and fuel cell 540 can be efficiently warmed up by the above-described oxidation reaction, dispensing with the need for special equipment (heating device or the like) to facilitate warming during startup. A structure in which efficient warming is achieved and power can be generated more rapidly in a steady state in this manner is particularly useful when the fuel cell system is frequently started and stopped, such as when the fuel cell system is used as a power supply for energizing an electric vehicle or other moving body.

According to the embodiment described above, the rate at which oxygen is fed to the cracking unit 20 during startup is controlled such that the O/C value is kept at about 1. Maintaining this value usually allows partial oxidation reactions to proceed adequately in the cracking unit 20, and oxidation reactions to proceed adequately in the fuel cell 540. However, oxygen can be further added downstream of the cracking unit 20 if there is a possibility that the amount of oxygen is insufficient for the oxidation reactions in the fuel cell 540. Further increasing the feed rate of oxygen to the cracking unit 20 will cause complete oxidation to become active instead of partial oxidation inside the cracking unit 20. Such complete oxidation yields water and carbon dioxide in the cracking unit 20, and these components cannot be used to allow oxidation to proceed further in the fuel cell 540. The oxygen feed rate should therefore be controlled such that the complete oxidation reaction will be well suppressed in the cracking unit 20 in order to ensure that the fuel cell 540 is efficiently heated. It is also possible to adopt an approach in which complete oxidation is performed prior to the partial oxidation to raise the internal temperature of the cracking unit 20 to a sufficiently high level.

When the cracking unit 20 and fuel cell 540 are heated to the desired temperature as a result of the above-described procedure, the O/C value is brought below 1, the aforementioned partial oxidation and complete oxidation reactions are suppressed, and the hydrocarbon-based fuel is decomposed using oxidation-generated heat. Another preferred step entails performing a control routine whereby the residual oxygen content of the gas fed to the fuel cell 540 is kept sufficiently low, electrochemical reactions are conducted instead of the oxidation reactions performed using externally supplied oxygen in the fuel cell 540, and the system is brought into a steady operating state.

Although the above third embodiment is described with reference to a case in which a hydrocarbon-based fuel is reformed in a fuel cell, it is also possible to adopt an arrangement in which a cracking unit is provided to a fuel cell system equipped with a fuel cell in which the hydrocarbon-based fuel is directly used as the electrode active material for the anode. In this case as well, an effect similar to the one in which minimal soot formation occurs in the fuel cell can be obtained by decomposing the hydrocarbons in a hydrocarbon-based fuel before feeding the fuel to an electrochemical reaction zone to obtain a hydrocarbon-based fuel with a lower carbon number.

Although the fuel cell system 510 shown in FIG. 17 is described with reference to a case in which the cracking unit 20 is provided as a separate device from the fuel cell 540, it is also possible to adopt an arrangement in which the two are integrated together and the cracking unit 20 is disposed inside the fuel cell 540 (reducing the distance between the location functioning as the cracking unit and the location where electrochemical reactions occur). Such a structure allows the energy efficiency of the entire system to be enhanced because the heat generated during heating in the fuel cell can be readily utilized when a hydrocarbon-based fuel is decomposed in the cracking unit 20. In addition, the entire system can be made more compact. Another feature of this structure is that the consumption rate of the hydrocarbon-based fuel in the oxidation reaction can be reduced because the oxidation reaction is carried out in the cracking unit in order to compensate for insufficient heat if the electrochemical reactions in the cell do not generate sufficient heat. In addition, the amount of gas components resulting from oxidation and not contributing to the electrochemical reactions can be reduced for the gas supplied to the electrochemical reaction zone, and cell performance can be improved accordingly. Once the fuel cell 540 has stopped generating power, it can be cooled down with the aid of the cracking unit 20.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel reforming apparatus for producing a hydrogen-rich gas from a hydrocarbon-based fuel by means of a reforming reaction, the fuel reforming apparatus comprising:

a fuel decomposition unit configured to decompose a first hydrocarbon-based fuel by means of pyrolysis into a second hydrocarbon-based fuel with a lower carbon number; and a reforming reactor having a reforming catalyst for promoting a reforming reaction, the reforming reactor being configured to produce a hydrogen-rich gas from the second hydrocarbon-based fuel by the reforming reaction.

2. A fuel reforming apparatus as defined in claim 1, further comprising:

oxygen supply means for feeding oxygen to the fuel decomposition unit, wherein the fuel decomposition unit is configured to operate such that the oxygen fed by the oxygen supply means is used to partially oxidize the first hydrocarbon-based fuel, and heat evolved by the oxidation is used to pyrolyze the remaining first hydrocarbon-based fuel.

3. A fuel reforming apparatus as defined in claim 2, wherein the fuel decomposition unit comprises a controller for controlling reaction conditions in the fuel decomposition unit such that the decomposition reaction of the first hydrocarbon-based fuel proceeds at a desired level while formation of soot that accompanies the decomposition of the first hydrocarbon-based fuel is suppressed during the decomposition of the first hydrocarbon-based fuel.

4. A fuel reforming apparatus as defined in claim 3, wherein the controller regulates a rate of entire reaction occurring in the fuel decomposition unit in response to a feed rate of the first hydrocarbon-based fuel fed to the fuel decomposition unit.

5. A fuel reforming apparatus as defined in claim 4, wherein the controller regulates the rate of the entire reaction by controlling a ratio of an amount of oxygen fed to the fuel decomposition unit to an amount of carbon in the first hydrocarbon-based fuel.

6. A fuel reforming apparatus as defined in claim 4, wherein the controller regulates the rate of the entire reaction by controlling a temperature inside the fuel decomposition unit.

7. A fuel reforming apparatus as defined in claim 6, wherein the controller controls the temperature inside the fuel decomposition unit by controlling a temperature of gas fed to the fuel decomposition unit.

8. A fuel reforming apparatus as defined in claim 7, wherein the gas fed to the fuel decomposition unit includes plural types of gases containing oxygen and vaporized first hydrocarbon-based fuel; and the controller controls a temperature of at least one gas selected from among the plural types of gases fed to the fuel decomposition unit.

9. A fuel reforming apparatus as defined in claim 3, wherein the controller regulates a residence time of fluids in the fuel decomposition unit in response to a feed rate of the first hydrocarbon-based fuel fed to the fuel decomposition unit.

10. A fuel reforming apparatus as defined in claim 9, wherein the controller regulates the residence time by controlling a pressure inside the fuel decomposition unit.

11. A fuel reforming apparatus as defined in claim 9, further comprising:

steam supply means for feeding steam to the fuel decomposition unit, wherein the controller regulates the residence time by controlling a ratio of an amount of steam fed to the fuel decomposition unit to an amount of carbon in the first hydrocarbon-based fuel.

12. A fuel reforming apparatus as defined in claim 11, wherein the controller regulates the residence time by controlling a volume of space in which reactions are actually conducted using the first hydrocarbon-based fuel in the fuel decomposition unit.

13. A fuel reforming apparatus as defined in claim 3, wherein the fuel decomposition unit operates such that the first hydrocarbon-based fuel is pyrolyzed to produce the second hydrocarbon-based fuel while the first hydrocarbon-based fuel is passing through the fuel decomposition unit; and the controller operates such that a reaction-terminating gas whose temperature is less than a temperature inside the fuel decomposition unit is fed to a specified location inside the fuel decomposition unit, thereby suppressing progress of unwanted reactions connected to soot formation downstream of the specified location.

14. A fuel reforming apparatus as defined in claim 13, wherein the reaction-terminating gas is air and/or steam.

15. A fuel reforming apparatus as defined in claim 13, further comprising:

water spraying means for spraying water at the specified location inside the fuel decomposition unit, the water sprayed by the water spraying means being vaporized inside the fuel decomposition unit to produce steam serving as the reaction-terminating gas.

16. A fuel reforming apparatus as defined in claim 2, wherein the fuel decomposition unit comprises temperature distribution averaging means for averaging out temperature distribution within the fuel decomposition unit in a direction of gas flow.

17. A fuel reforming apparatus as defined in claim 16, wherein the temperature distribution averaging means includes heat transfer means for transferring heat evolved in an active region of oxidation reaction of the first hydrocarbon-based fuel to a less active region of the oxidation reaction in the fuel decomposition unit.

18. A fuel reforming apparatus as defined in claim 16, wherein the temperature distribution averaging means includes first divisional supply means for divisionally feeding the first hydrocarbon-based fuel to separate locations along a direction of gas flow in the fuel decomposition unit.

19. A fuel reforming apparatus as defined in claim 16, wherein the temperature distribution averaging means includes second divisional supply means for divisionally feeding oxygen to separate locations along a direction of gas flow in the fuel decomposition unit.

20. A fuel reforming apparatus as defined in claim 2, wherein the oxygen supply means comprises:

first oxygen supply means for supplying oxygen at an upstream side of the fuel decomposition unit to cause oxidation of the first hydrocarbon-based fuel, thereby starting the decomposition reaction; and second oxygen supply means for adding oxygen at a downstream side of the fuel decomposition unit for the oxidation of the first hydrocarbon-based fuel.

21. A fuel reforming apparatus as defined in claim 2, further comprising:

a heater for producing heat by oxidation reaction and heating the first hydrocarbon-based fuel before being fed to the fuel decomposition unit; and exhaust gas supply means for supplying an exhaust gas produced by the oxidation reaction in the heater to the fuel decomposition unit.

22. A fuel reforming apparatus as defined in claim 1, wherein the fuel decomposition unit comprises a controller for controlling reaction conditions in the fuel decomposition unit such that the decomposition reaction of the first hydrocarbon-based fuel proceeds at a desired level while formation of soot that accompanies the decomposition of the first hydrocarbon-based fuel is suppressed during the decomposition of the first hydrocarbon-based fuel.

23. A fuel reforming apparatus as defined in claim 1, wherein the fuel decomposition unit includes a catalyst for promoting the decomposition reaction of the first hydrocarbon-based fuel.

24. A fuel reforming apparatus as defined in claim 1, wherein the fuel decomposition unit includes a plasma-generating unit configured to generate a low-temperature plasma designed to promote the decomposition reaction of the first hydrocarbon-based fuel.

25. A fuel reforming apparatus as defined in claim 1, wherein the first hydrocarbon-based fuel is a higher hydrocarbon-based fuel with a carbon number of 4 or greater.

26. A fuel reforming apparatus as defined in claim 25, wherein the higher hydrocarbon-based fuel is a hydrocarbon-based fuel selected from gasoline, naphtha, and light oil.

27. A fuel reforming apparatus as defined in claim 1, further comprising supplementary feeding means for feeding the reforming reactor with steam and/or oxygen-containing gas separately from gas containing the second hydrocarbon-based fuel supplied from the fuel decomposition unit.

28. A fuel reforming apparatus as defined in claim 27, wherein the supplementary feeding means feeds steam to the reforming reactor; and
the steam fed to the reforming reactor by the supplementary feeding means is sprayed in liquid state inside the reforming reactor and vaporized by heat of the gas containing the second hydrocarbon-based fuel supplied from the fuel decomposition unit.

29. A fuel reforming apparatus as defined in claim 1, further comprising temperature increase promoting means for promoting an increase in an internal temperature near an inlet portion of the fuel decomposition unit.

30. A fuel reforming apparatus as defined in claim 1, further comprising a mixing unit configured to mix fluids to be fed to the fuel decomposition unit in gaseous state before being fed to the fuel decomposition unit.

31. A fuel reforming apparatus for producing hydrogen-rich gas from a hydrocarbon-based fuel by means of a reforming reaction, comprising:
a reforming reactor having a reforming catalyst for promoting the reforming reaction; and
means for feeding the hydrocarbon-based fuel to the reforming reactor,
wherein the reforming reactor maintains activity of the reforming reaction occurring on a surface of the reforming catalyst while suppressing unwanted gas-phase reactions occurring in the reforming reactor off the surface of the reforming catalyst.

32. A fuel reforming apparatus as defined in claim 31, wherein the reforming reactor includes a porous article or a honeycomb tube whose surface is used to support the reforming catalyst, and the gas-phase reactions are suppressed by providing the porous article or the honeycomb tube with sufficiently small size.

33. A fuel reforming apparatus as defined in claim 31, wherein the reforming reactor is designed to control the gas-phase reactions by selecting a sufficiently low value for a ratio L/D, L denoting a length of a flow passage of the hydrocarbon-based fuel in the reforming reactor, D denoting a cross-sectional diameter of the flow passage of the hydrocarbon-based fuel in the reforming reactor.

34. A fuel reforming apparatus as defined in claim 31, wherein the hydrocarbon-based fuel is a higher hydrocarbon-based fuel with a carbon number of 4 or greater.

35. A fuel reforming apparatus as defined in claim 34, wherein the hydrocarbon-based fuel is a hydrocarbon-based fuel selected from gasoline, naphtha, and light oil.

36. A fuel reforming apparatus as defined in claim 31, further comprising a mixing unit configured to mix fluids to be fed to the reforming reactor in gaseous state before being fed to the reforming reactor.

37. A fuel cell system, comprising:
a fuel cell for generating electromotive force by electrochemical reactions; and
a fuel reforming apparatus for producing a hydrogen-rich gas from a hydrocarbon-based fuel by means of a reforming reaction, and supplying the hydrogen-rich gas to the fuel cell,
the fuel reforming apparatus comprising:
a fuel decomposition unit configured to decompose a first hydrocarbon-based fuel by means of pyrolysis into a second hydrocarbon-based fuel with a lower carbon number; and
a reforming reactor having a reforming catalyst for promoting a reforming reaction, the reforming reactor being configured to produce a hydrogen-rich gas from the second hydrocarbon-based fuel by the reforming reaction.

38. A fuel cell system, comprising:
a fuel cell for generating electromotive force by electrochemical reactions; and
a fuel reforming apparatus for producing a hydrogen-rich gas from a hydrocarbon-based fuel by means of a reforming reaction, and supplying the hydrogen-rich gas to the fuel cell,
the fuel reforming apparatus comprising:
a fuel decomposition unit configured to decompose a first hydrocarbon-based fuel by means of pyrolysis into a second hydrocarbon-based fuel with a lower carbon number;
a reforming reactor having a reforming catalyst for promoting a reforming reaction, the reforming reactor being configured to produce a hydrogen-rich gas from the second hydrocarbon-based fuel by the reforming reaction; and
oxygen supply means for feeding oxygen to the fuel decomposition unit,
wherein the fuel decomposition unit is configured to operate such that the oxygen fed by the oxygen supply means is used to partially oxidize the first hydrocarbon-based fuel, and heat evolved by the oxidation is used to pyrolyze the remaining first hydrocarbon-based fuel, and
wherein the oxygen supply means supplies a cathode off-gas discharged from the fuel cell to the fuel decomposition unit as part of the oxygen fed to the fuel decomposition unit.

39. A fuel cell system as defined in claim 38, wherein the oxygen supply means can feed both the cathode off-gas and air to the fuel decomposition unit in order to provide the fuel decomposition unit with oxygen; and
wherein the oxygen supply means includes an oxidation gas controller for controlling a ratio of the cathode off-gas and air supplied to the fuel decomposition unit.

40. A fuel cell system, comprising:
a fuel cell for generating electromotive force by electrochemical reactions; and
a fuel reforming apparatus for producing a hydrogen-rich gas from a hydrocarbon-based fuel by means of a reforming reaction, and supplying the hydrogen-rich gas to the fuel cell, the fuel reforming apparatus comprising:
- a fuel decomposition unit configured to decompose a first hydrocarbon-based fuel by means of pyrolysis into a second hydrocarbon-based fuel with a lower carbon number;
- a reforming reactor having a reforming catalyst for promoting a reforming reaction, the reforming reactor being configured to produce a hydrogen-rich gas from the second hydrocarbon-based fuel by the reforming reaction; and
- oxygen supply means for feeding oxygen to the fuel decomposition unit, wherein the fuel decomposition unit is configured to operate such that the oxygen fed by the oxygen supply means is used to partially oxidize the first hydrocarbon-based fuel, and heat evolved by the oxidation is used to pyrolyze the remaining first hydrocarbon-based fuel, and wherein the fuel reforming apparatus further comprises anode off-gas supply means for supplying an anode off-gas discharged from the fuel cell to the fuel decomposition unit.

41. A fuel cell system as defined in claim 40, wherein the anode off-gas supply means comprises an anode off-gas flow rate controller for controlling a feed rate of the anode off-gas fed to the fuel decomposition unit in response to a feed rate of the first hydrocarbon-based fuel fed to the fuel decomposition unit.

42. A fuel cell system, comprising:
a fuel cell for generating electromotive force by electrochemical reactions; and
a fuel reforming apparatus for producing a hydrogen-rich gas from a hydrocarbon-based fuel by means of a reforming reaction, and supplying the hydrogen-rich gas to the fuel cell, the fuel reforming apparatus comprising:
- a fuel decomposition unit configured to decompose a first hydrocarbon-based fuel by means of pyrolysis into a second hydrocarbon-based fuel with a lower carbon number; and
- a reforming reactor having a reforming catalyst for promoting a reforming reaction, the reforming reactor being configured to produce a hydrogen-rich gas from the second hydrocarbon-based fuel by the reforming reaction, wherein the fuel decomposition unit comprises a heat exchanger capable of exchanging heat with a specified high-temperature fluid discharged from a specified location inside the fuel cell system such that the pyrolysis is accomplished using the heat obtained by heat exchange with the specified high-temperature fluid.

43. A fuel cell system as defined in claim 42, further comprising a complete oxidation unit configured to completely oxidize a same type of first hydrocarbon-based fuel as that decomposed in the fuel decomposition unit, thereby producing the high-temperature fluid including a completely oxidized gas.

44. A fuel cell system as defined in claim 42, wherein the high-temperature fluid is an oxidized gas obtained by oxidizing hydrogen in an anode off-gas discharged from the fuel cell.

45. A fuel cell system as defined in claim 42, further comprising a heater for producing heat by oxidation reaction and heating the first hydrocarbon-based fuel before being fed to the fuel decomposition unit, wherein the high-temperature fluid is an oxidized gas produced by the oxidation in the heater.

46. A fuel cell system, comprising:
a fuel cell for generating electromotive force by electrochemical reactions, and
a fuel decomposition unit configured to decompose a first hydrocarbon-based fuel into a second hydrocarbon-based fuel with a lower carbon number, the second hydrocarbon-based fuel being fed to the fuel cell to cause the electrochemical reactions, wherein the fuel cell is a high-temperature fuel cell, and the fuel decomposition unit decompose the first hydrocarbon-based fuel by pyrolysis, the pyrolysis being promoted by heat generated by the fuel cell.

47. A fuel cell system as defined in claim 46, wherein the fuel cell is configured such that oxide ions move across an electrolyte.

48. A fuel cell system as defined in claim 46, wherein the first hydrocarbon-based fuel is a higher hydrocarbon-based fuel with a carbon number of 4 or greater.

49. A fuel reforming method for producing a hydrogen-rich gas from a hydrocarbon-based fuel, comprising the steps of:
(a) decomposing a first hydrocarbon compound into a second hydrocarbon-based fuel with a lower carbon number; and
(b) producing a hydrogen-rich gas from the second hydrocarbon-based fuel by a reforming reaction, wherein the decomposition of the first hydrocarbon-based fuel is performed by pyrolysis.

50. A fuel reforming method as defined in claim 49, wherein the step (a) comprises the steps of:
(a-1) oxidizing a same type of hydrocarbon-based fuel as the first hydrocarbon-based fuel, thereby generating heat; and
(a-2) pyrolyzing the first hydrocarbon-based fuel by employing the heat generated in the step (a-1).

51. A fuel reforming method for producing a hydrogen-rich gas from a hydrocarbon-based fuel by means of a reforming reaction, characterized in that:
the reforming reaction proceeds on a surface of a reforming catalyst sufficiently active to promote the reforming reaction; and
the reforming reaction is kept active while unwanted gas-phase reactions occurred in a gas-phase off the surface of the reforming catalyst are adequately suppressed.

52. A method for starting up a fuel cell system, the fuel cell system comprising a fuel cell, and a fuel decomposition unit configured to receive a supply of oxygen and first hydrocarbon-based fuel, and to partially oxidize the first hydrocarbon-based fuel using the oxygen, and to pyrolize the remaining first hydrocarbon-based fuel using oxidation-evolved heat to thereby produce a second hydrocarbon-based fuel with a lower carbon number, the second hydrocarbon-based fuel being fed to the fuel cell from the fuel decomposition unit, characterized by
raising a ratio of an amount of oxygen to an amount of the first hydrocarbon-based fuel fed to the fuel decomposition unit until the fuel cell is heated up to a specified temperature, thereby adequately causing partial oxidation of the first hydrocarbon-based fuel in the fuel decomposition unit and promoting oxidation of hydrogen and carbon monoxide produced by the partial oxidation reaction on an anode-side catalyst inside the fuel cell.

* * * * *